(12) United States Patent
Baba et al.

(10) Patent No.: US 10,710,187 B2
(45) Date of Patent: Jul. 14, 2020

(54) WELDING METHOD AND ARC WELDING DEVICE

(71) Applicant: DAIHEN Corporation, Osaka-shi, Osaka (JP)

(72) Inventors: Hayato Baba, Osaka (JP); Hideo Shiozaki, Osaka (JP); Tetsuo Era, Osaka (JP)

(73) Assignee: DAIHEN Corporation, Osaka-shi, Osaka (JP)

( * ) Notice: Subject to any disclaimer, the term of this patent is extended or adjusted under 35 U.S.C. 154(b) by 344 days.

(21) Appl. No.: 15/753,956

(22) PCT Filed: Aug. 24, 2016

(86) PCT No.: PCT/JP2016/074690
§ 371 (c)(1),
(2) Date: Feb. 20, 2018

(87) PCT Pub. No.: WO2017/033978
PCT Pub. Date: Mar. 2, 2017

(65) Prior Publication Data
US 2018/0236584 A1  Aug. 23, 2018

(30) Foreign Application Priority Data

Aug. 25, 2015 (JP) ................. 2015-166231
Aug. 25, 2015 (JP) ................. 2015-166232
(Continued)

(51) Int. Cl.
*B23K 9/095* (2006.01)
*B23K 9/173* (2006.01)
(Continued)

(52) U.S. Cl.
CPC .............. *B23K 9/095* (2013.01); *B23K 9/124* (2013.01); *B23K 9/125* (2013.01); *B23K 9/173* (2013.01); *B23K 33/004* (2013.01)

(58) Field of Classification Search
CPC ........ B23K 9/095; B23K 9/124; B23K 9/125; B23K 9/00; B23K 9/02; B23K 9/12;
(Continued)

(56) References Cited

U.S. PATENT DOCUMENTS 3,581,052 A * 5/1971 Milton ................. B23K 9/0956
219/130.21
4,088,866 A * 5/1978 Lund .................... B23K 9/0017
219/137 R
(Continued)

FOREIGN PATENT DOCUMENTS

CN         1751834 A      3/2006
CN       101143401 A      3/2008
(Continued)

OTHER PUBLICATIONS

Office Action for Chinese Application No. 201680049906.X dated Apr. 24, 2020, 15 pages.
(Continued)

*Primary Examiner* — Benjamin R Shaw
(74) *Attorney, Agent, or Firm* — Bret E. Field; Bozicevic, Field & Francis LLP

(57) ABSTRACT

The welding method comprises: a step of preparing a first base material and a second base material; a step of disposing the first base material and the second base material in a manner such that a first end face of the first base material and a second end face of the second base material face each other; and a step of welding the first base material and the second base material together using GMA welding so that the first end face and the second end face are joined together.

(Continued)

In the step of welding the first base material and the second base material together, an arc is formed in a state where the welding wire penetrates into a region surrounded by a molten region, so that the molten region is formed to pierce through the first base material and the second base material in the thickness direction.

14 Claims, 29 Drawing Sheets

(30) Foreign Application Priority Data

| | | |
|---|---|---|
| Aug. 25, 2015 | (JP) | 2015-166233 |
| Feb. 18, 2016 | (JP) | 2016-029260 |
| Aug. 22, 2016 | (JP) | 2016-161844 |

(51) Int. Cl.
  *B23K 9/12* (2006.01)
  *B23K 33/00* (2006.01)

(58) Field of Classification Search
  CPC .. B23K 9/173; B23K 33/004; B23K 15/0046; B23K 15/0053
  USPC .............................. 219/121.13, 121.14, 136
  See application file for complete search history.

(56) References Cited

U.S. PATENT DOCUMENTS

| | | | | |
|---|---|---|---|---|
| 4,507,540 | A * | 3/1985 | Hamasaki | B23K 26/1429 |
| | | | | 219/121.64 |
| 4,529,863 | A * | 7/1985 | Lebel | B23K 9/173 |
| | | | | 219/137.42 |
| 8,927,901 | B2 * | 1/2015 | Stol | B23K 9/127 |
| | | | | 219/124.22 |
| 8,941,031 | B2 * | 1/2015 | Behmlander | B23K 26/0869 |
| | | | | 219/136 |
| 2001/0009252 | A1 * | 7/2001 | Hiraoka | B23K 9/173 |
| | | | | 219/125.12 |
| 2001/0047988 | A1 * | 12/2001 | Hiraoka | B23K 9/092 |
| | | | | 219/137 PS |
| 2008/0053978 | A1 * | 3/2008 | Peters | B23K 9/125 |
| | | | | 219/130.5 |
| 2011/0253679 | A1 | 10/2011 | Yamazaki et al. | |
| 2012/0024822 | A1 | 2/2012 | Hayakawa et al. | |
| 2014/0021186 | A1 * | 1/2014 | Denney | B23K 35/368 |
| | | | | 219/137.2 |
| 2014/0027415 | A1 * | 1/2014 | Lin | B23K 26/348 |
| | | | | 219/121.64 |
| 2014/0034622 | A1 * | 2/2014 | Barrett | B23K 33/004 |
| | | | | 219/121.64 |
| 2014/0263239 | A1 * | 9/2014 | Peters | B23K 9/0213 |
| | | | | 219/130.21 |
| 2017/0014935 | A1 * | 1/2017 | Miklos | B23K 9/173 |
| 2019/0283165 | A1 * | 9/2019 | Baba | B23K 9/125 |

FOREIGN PATENT DOCUMENTS

| | | |
|---|---|---|
| CN | 102240860 A | 11/2011 |
| CN | 102240861 A | 11/2011 |
| EP | 0983816 A2 | 3/2000 |
| JP | H11-123553 | 5/1999 |
| JP | 2007-229775 | 9/2007 |
| JP | 2007-260692 | 10/2007 |
| JP | 2010-221298 | 10/2010 |
| JP | 2011-218437 | 11/2011 |
| JP | 2014-159034 | 9/2014 |

OTHER PUBLICATIONS

International Search Report dated Sep. 27, 2016 of PCT/JP2016/074690.

Muraoka et al., "Improvement of weld shape in CO2 gas arc welding by power modulation," Summary of National Meeting—Japan Welding Society, Apr. 2015, pp. 134-135, vol. 96.

Tsuji et al., "Robot Welding Process for Medium and Heavy Plate," Kobelco Technology Review, pp. 9-15, Dec. 2013, No. 32.

Extended European Search Report for European Patent Application No. 16839325.4, dated Jun. 13, 2019.

* cited by examiner

| AMPLITUDE CONDITION | APPEARANCE OF BEAD |
|---|---|
| WIRE DIAMETER 1.4mm, PROJECTING LENGTH 18mm, FEED SPEED 17.5m/min, WELDING CURRENT 530A ||
| FREQUENCY 0Hz CURRENT AMPLITUDE 0A |  |
| FREQUENCY 10Hz CURRENT AMPLITUDE 50A |  |
| FREQUENCY 50Hz CURRENT AMPLITUDE 100A |  |

| AMPLITUDE CONDITION | APPEARANCE OF BEAD |
|---|---|
| WIRE DIAMETER 1.4mm, PROJECTING LENGTH 18mm, FEED SPEED 17.5m/min, WELDING CURRENT 530A ||
| FREQUENCY 0Hz CURRENT AMPLITUDE 0A | |
| FREQUENCY 10Hz CURRENT AMPLITUDE 50A | |
| FREQUENCY 50Hz CURRENT AMPLITUDE 100A | |

10mm

| WELDING CONDITION | 0 ms | 0.4 ms | 0.8 ms | DROPLET TRANSFER FORM |
|---|---|---|---|---|
| WIRE FEED SPEED: 30 m/min<br>WELDING CURRENT: 450 A<br>OUTPUT VOLTAGE: 39 V |  |  |  | DROP TRANSFER |
| WIRE FEED SPEED: 50 m/min<br>WELDING CURRENT: 620 A<br>OUTPUT VOLTAGE: 55 V |  |  |  | PENDULUM TRANSFER |
| WIRE FEED SPEED: 60 m/min<br>WELDING CURRENT: 700 A<br>OUTPUT VOLTAGE: 60 V |  |  |  | ROTATING TRANSFER |

WELDING METHOD AND ARC WELDING DEVICE

CROSS-REFERENCE TO RELATED APPLICATIONS

This application is the national phase under 35 U. S. C. § 371 of PCT International Application No. PCT/JP2016/074690 which has an International filing date of Aug. 24, 2016 and designated the United States of America.

FIELD

The present invention relates to a welding method and an arc welding device.

BACKGROUND

In butt welding of welding end faces of a pair of base materials together so as to join the end faces together in a state where the end faces are disposed to face each other, a molten region is formed by welding to pierce through the base materials in the thickness direction (piercing welding), and therefore the work efficiency of welding can be improved. Employment of submerged arc welding is effective for achievement of piercing welding. In butt welding for which submerged arc welding is employed, a measure to achieve quality improvement of a welding part or the like has been proposed (see Japanese Patent Application Laid-Open No. 2010-221298 and Japanese Patent Application Laid-Open No. 2007-260692, for example).

On the other hand, one of welding methods is a gas shielded arc welding method of consumable electrode type (e.g., Japanese Patent Application Laid-Open No. 2007-229775). A gas shielded arc welding method is a technique of generating an arc between a base material and a welding wire, which is fed to a welded part of the base material, and welding the base material using heat of the arc, and welding is performed while jetting inert gas to the periphery of a welding part especially in order to prevent oxidation of the base material which has become hot. In a case of a thin plate having a thickness of approximately 5 mm, a butt joint of the base material can be welded with one pass.

In a case of a thick plate having a thickness of 9 to 30 mm, however, it is impossible to weld the base material with one pass in a conventional gas shielded arc welding method. Therefore, welding of a thick plate is performed using multilayer welding in which a welding operation is performed repeatedly a plurality of times.

In multilayer welding, however, increase in man-hour for welding becomes a problem. Moreover, heat input becomes large, and deformation of the base material and embrittlement of a welding portion become problems.

SUMMARY

In the above submerged arc welding, it is required to supply granular flux to a welding part. Accordingly, the posture of welding is limited in submerged arc welding. Moreover, a welding device tends to be large in size in submerged arc welding.

Submerged arc welding has the disadvantages described above, while achievement of piercing welding is easy in submerged arc welding.

As a result of earnest investigation aimed at solving such problems, the present inventors have found that single pass welding for a thick plate can be realized by feeding a welding wire at a higher speed and supplying larger current than a general gas shielded arc welding method. Specifically, single pass welding for a thick plate can be realized by feeding a welding wire at a speed of approximately 5 to 100 m/min and supplying a large current equal to or larger than 300 A. By performing high-speed feed of a welding wire and large current supply, a concave molten portion is formed at the base material by heat of an arc, and the tip part of the welding wire enters a space surrounded by the molten portion. When the tip part of the welding wire enters into a part deeper than the surface of the base material, the molten portion pierces to the rear side in the thickness direction of the base material, and single pass welding becomes possible. In the following description, a space surrounded by the concave molten portion will be referred to as a buried space, and an arc, which is generated between the tip part of the welding wire that enters the buried space and the base material or the molten portion, will be suitably referred to as a buried arc.

The object of the present disclosure is to provide a welding method, which makes it possible to improve the work efficiency of welding by achieving piercing welding in butt welding using GMA (Gas Metal Arc) welding.

On the other hand, a gas shielded arc welding method of large current has problems that base material molten by heat of an arc and molten metal of the welding wire increase, that waving of molten metal is caused by the arc, and that the shape of a bead obtained by solidification of the molten metal is periodically disordered largely. For example, it has been confirmed that molten metal waves largely and meandering and hanging of a bead occur when a welding wire is fed at a speed of 30 m/min and butt carbon-oxide welding is performed with a welding current of 450 A, a welding voltage of 40 V and a board thickness of 12 mm.

The present disclosure has been made in view of such circumstances, and the object thereof is to provide a welding method and an arc welding device, which can suppress waving of molten metal in buried arc welding and prevent occurrence of turbulence and hanging of a bead even in a case where gas shielded arc welding is performed using a large current equal to or larger than 300 A.

A welding method according to the present disclosure comprises: a step of preparing a first base material and a second base material; a step of disposing the first base material and the second base material in a manner such that a first end face of the first base material and a second end face of the second base material face each other; and a step of welding the first base material and the second base material together so that the first end face and the second end face are joined together. In the step of welding the first base material and the second base material together, an arc is formed between a welding wire and each of the first base material and the second base material, and a molten region is formed at the first base material and the second base material by heat of the arc, so that the first base material and the second base material are welded together. In the step of welding the first base material and the second base material together, the arc is formed in a state where the welding wire penetrates into a region surrounded by the molten region, so that the molten region is formed to pierce through the first base material and the second base material in the thickness direction.

The present inventors have examined a measure to achieve piercing welding using GMA welding. As a result, the present inventors have found that it is possible to achieve piercing welding by carrying out welding while maintaining a state (a buried arc state) where an arc is formed in a state where a welding wire penetrates into a region surrounded by a molten region.

In a welding method of the present disclosure, the arc is formed in a state where the welding wire penetrates into a region surrounded by the molten region, so that the molten region is formed to pierce through the first base material and the second base material in the thickness direction. Accordingly, it is possible with a welding method of the present disclosure to improve the work efficiency of welding by achieving piercing welding in butt welding using GMA welding.

A welding method according to the present disclosure comprises: a step of preparing a first base material and a second base material; a step of disposing the first base material and the second base material in a manner such that a first end face of the first base material and a second end face of the second base material face each other; and a step of welding the first base material and the second base material together by GMA welding so that the first end face and the second end face are joined together. In the step of welding the first base material and the second base material together, an arc is formed between a welding wire and each of the first base material and the second base material, and a molten region is formed at the first base material and the second base material by heat of the arc, so that the first base material and the second base material are welded together. In the step of welding the first base material and the second base material together, the arc is formed while the position of the tip of the welding wire reciprocates between a first depth and a second depth, which is deeper than the first depth, in the thickness direction of the first base material and the second base material in a state where the welding wire penetrates into a region surrounded by the molten region, so that the molten region is formed to pierce through the first base material and the second base material in the thickness direction.

The present inventors have examined a measure to achieve piercing welding using GMA welding. As a result, the present inventors have obtained the following knowledge and conceived of the present disclosure. It becomes easy to achieve piercing welding by carrying out welding while maintaining a state (a buried arc state) where an arc is formed in a state where a welding wire penetrates into a region surrounded by a molten region.

On the other hand, in a case where piercing welding is achieved in such a manner, there sometimes arises a state (overlap) where a bead formed by solidification of a molten region covers a part of a main surface (a main surface on a side where a welding wire penetrates) of a base material, which is maintained in a non-molten state. In such a case, there arises a state where the main surface of the base material and the bead are not sufficiently joined together. Accordingly, a region where overlap occurs may possibly constitute a defect of a junction and lower the strength of the junction. According to examination by the present inventors, it is possible to achieve piercing welding while suppressing occurrence of overlap, when an arc is formed while the position of the tip of the welding wire reciprocates in the thickness direction of the first base material and the second base material. That is, in a state where the welding wire penetrates deeply (to a second depth), heat of an arc is applied to a region far from a main surface of a base material on a side where the welding wire penetrates, and contributes to achievement of piercing welding. In a state where the welding wire penetrates shallowly (to a first depth), heat of an arc is applied to a region near to a main surface of a base material on a side where the welding wire penetrates, and occurrence of overlap is suppressed. Since a state where the welding wire penetrates deeply and a state where the welding wire penetrates shallowly are alternately repeated, it is possible to achieve piercing welding while suppressing occurrence of overlap.

In a welding method of the present disclosure, an arc is formed while the position of the tip of the welding wire reciprocates in the thickness direction of the first base material and the second base material in a state where the welding wire penetrates into a region surrounded by a molten region, so that the molten region is formed to pierce through the first base material and the second base material in the thickness direction. Accordingly, it is possible with a welding method of the present disclosure to improve the work efficiency of welding by achieving piercing welding in butt welding using GMA welding.

In the step of welding the first base material and the second base material together in the above welding method, a state where the welding wire penetrates to a first depth and the transfer form of a droplet formed by melting the welding wire into the molten region is rotating transfer and a state where the welding wire penetrates to a second depth and the transfer form is a transfer form other than rotating transfer may be alternately repeated.

In a state of rotating transfer, the tip of the welding wire rotates on an axis along the thickness direction of the first base material and the second base material. Accordingly, an arc to be formed rotates on said axis. Since the transfer form is put into rotating transfer in a state where the welding wire penetrates shallowly (to the first depth), it becomes easier to supply heat of an arc to a region where occurrence of overlap is concerned. As a result, occurrence of overlap is suppressed more reliably.

A welding method according to the present disclosure comprises: a step of preparing a first base material and a second base material; a step of disposing the first base material and the second base material in a manner such that a first end face of the first base material and a second end face of the second base material face each other; and a step of welding the first base material and the second base material together using GMA welding so that the first end face and the second end face are joined together. In the step of welding the first base material and the second base material together, an arc is formed between the welding wire and each of the first base material and the second base material, and a molten region is formed at the first base material and the second base material by heat of the arc, so that the first base material and the second base material are welded together. In the step of welding the first base material and the second base material together, an arc is formed while a state where the welding wire penetrates into a region surrounded by the molten region and a state where the welding wire is out of a region surrounded by the molten region are alternately repeated, so that the molten region is formed to pierce through the first base material and the second base material in the thickness direction.

The present inventors have examined a measure to achieve piercing welding using GMA welding. As a result, the present inventors have obtained the following knowledge and conceived of the present disclosure. It becomes easy to achieve piercing welding by carrying out welding in a state (a buried arc state) where an arc is formed in a state where a welding wire penetrates into a region surrounded by a molten region.

On the other hand, in a case where piercing welding is achieved in such a manner, there sometimes arises a state (overlap) where a bead formed by solidification of a molten region covers a part of a main surface (a main surface on a side where a welding wire penetrates) of a base material, which is maintained in a non-molten state. In such a case, there arises a state where the main surface of the base material and the bead are not sufficiently joined together. Accordingly, a region where overlap occurs may possibly constitute a defect of a junction and lower the strength of the junction. According to examination by the present inventors, it is possible to achieve piercing welding while suppressing occurrence of overlap, when an arc is formed while a state (a buried arc state) where a welding wire penetrates into a region surrounded by a molten region and a state (a state where a buried arc is cancelled) where a welding wire is out of a region surrounded by a molten region are alternately repeated. That is, in a buried arc state, heat of an arc is applied to a region far from a main surface of a base material on a side where a welding wire penetrates, and attributes to achievement of piercing welding. In a state where a buried arc is cancelled, heat of an arc is applied to a region near to a main surface of a base material on a side where a welding wire penetrates, and occurrence of overlap is suppressed. Since the buried arc state and the state where a buried arc is cancelled are alternately repeated, it becomes possible to achieve piercing welding while suppressing occurrence of overlap.

In a welding method of the present disclosure, an arc is formed while a buried arc state and a state where an arc is cancelled are alternately repeated, so that a molten region is formed to pierce through the first base material and the second base material in the thickness direction. Accordingly, it is possible with a welding method of the present disclosure to improve the work efficiency of welding by achieving piercing welding in butt welding using GMA welding.

In the step of welding the first base material and the second base material together using GMA welding in the above welding method, the first base material and the second base material may be welded together in a manner such that the thickness of the first base material and the second base material with respect to the width of a molten region in a direction perpendicular to the first end face and the second end face becomes equal to or smaller than 1.3. It is thus possible to suppress generation of a pear-shaped bead crack, which is a phenomenon that a central part of a bead formed by solidification of a molten region breaks along the thickness direction of the first base material and the second base material. Here, the width of the above welding region means a width of a molten region seen planarly along a direction, which is perpendicular to a main surface of the first base material and the second base material, from a side where a welding wire penetrates.

In the step of welding the first base material and the second base material together in the above welding method, the feed speed of the welding wire is increased and decreased, so that a state where the welding wire penetrates into a region surrounded by the molten region and a state where the welding wire is out of a region surrounded by the molten region may be alternately repeated.

By increasing and decreasing the feed speed of the welding wire, it is possible to control the welding state in a manner such that a buried arc state and a state where an arc is cancelled are alternately repeated.

In the step of welding the first base material and the second base material together in the above welding method, the feed speed of the welding wire may be equal to or higher than 30 m/min. It thus becomes easy to maintain a buried arc state. It is to be noted that the transfer state of a droplet may possibly become rotating transfer when the feed speed of the welding wire exceeds 60 m/min. As a result, weld penetration becomes shallow, and achievement of piercing welding may possibly become difficult. Accordingly, the feed speed of the welding wire may be set equal to or lower than 60 m/min. Moreover, the feed speed of the welding wire may be set equal to or lower than 50 m/min from the perspective of avoiding weld penetration from being shallow more reliably.

In the step of preparing the first base material and the second base material in the above welding method, a first base material and a second base material having a thickness equal to or larger than 9 mm and equal to or smaller than 30 mm may be prepared. Achievement of piercing welding using GMA welding is effective from the perspective of improving the work efficiency especially regarding a base material having a thickness equal to or larger than 9 mm. On the other hand, achievement of piercing welding may possibly become difficult when the thickness of the base material exceeds 30 mm. Accordingly, the thickness of the first base material and the second base material may be set equal to or larger than 9 mm and equal to or smaller 30 mm.

In the step of welding the first base material and the second base material together in the above welding method, a first base material and a second base material having no beveling edge may be welded together.

It is also possible with a welding method of the present disclosure to weld a base material having no beveling edge. In a case where a beveling edge is formed, a region where the beveling edge is formed needs to be filled at the time of welding. Accordingly, distortion of a base material may possibly become large for a reason such that the amount of a filler material to be supplied to a welding part increases, for example. By welding a base material having no beveling edge with a welding method of the present disclosure, it is possible to suppress occurrence of such a problem.

In the step of welding the first base material and the second base material together in the above welding method, the first base material and the second base material may be welded together in a state where voltage reduction with respect to current increase of 100 A is equal to or larger than 4 V and equal to or smaller than 20 V.

By setting the external characteristic (the output characteristic) of a power source in such a manner at the time of welding, it becomes easy to maintain a buried arc state. The reason thereof is thought to be as follows. In a case where the above voltage reduction is smaller than 4 V, fluctuation of voltage with respect to fluctuation of arc length due to a disturbance factor is small, and current fluctuates largely. As a result, a molten region swings largely, and it becomes difficult to maintain a buried arc state. By setting the above voltage reduction equal to or larger than 4 V, swing of a molten region is suppressed, and it becomes easy to maintain a buried arc state.

Moreover, in a case where the arc length becomes small due to a disturbance factor, the current value increases, the melting speed of the melting wire increases, and the arc length becomes large. On the other hand, in a case where the arc length becomes large due to a disturbance factor, the current value decreases, the melting speed of the melting wire lowers, and the arc length becomes small (a self-adjusting effect of arc length). When the above voltage reduction exceeds 20 V, fluctuation of current with respect to fluctuation of arc length due to a disturbance factor is small, and therefore the above self-adjusting effect of arc length becomes small. As a result, it becomes difficult to maintain a buried arc state. By setting the above voltage reduction equal to or smaller than 20 V, the above self-adjusting effect of arc length is maintained, and it becomes easy to maintain a buried arc state.

In the above welding method, the above voltage reduction may be equal to or larger than 5 V. Thus, swing of a molten region is suppressed, and it becomes further easier to maintain a buried arc state.

In the above welding method, the above voltage reduction may be equal to or smaller than 15 V. Thus, a self-adjusting effect of arc length is maintained further reliably, and it becomes further easier to maintain a buried arc state.

In the above welding method, the above welding wire may be a solid wire. In a welding method of the present disclosure, employment of a solid wire is suitable.

In the above welding method, the diameter of the welding wire may be equal to or larger than 0.9 mm and equal to or smaller than 1.6 mm. This makes it easy to maintain a buried arc state. In a welding method of the present disclosure, employment of a welding wire having a diameter within such a range is suitable.

A welding method according to the present disclosure is a welding method of consumable electrode type, which feeds a welding wire to a welded part of a base material and supplies welding current to the welding wire so as to generate an arc between a tip part of the welding wire and the welded part and weld the base material, wherein the welding wire is fed at a speed, at which the tip part enters a space surrounded by a concave molten portion formed at the base material by an arc generated between the tip part and the welded part, and the welding current is fluctuated in a manner such that the frequency of the welding current becomes equal to or higher than 10 Hz and equal to or lower than 1,000 Hz, the mean current becomes equal to or larger than 300 A, and the current amplitude becomes equal to or larger than 50 A.

In the present disclosure, the tip part of the welding wire enters a buried space surrounded by a concave molten portion, and a buried arc is generated. Specifically, the tip part of the welding wire is put into a state surrounded by the molten portion, and the welding current is periodically fluctuated, so that the wire tip position in the buried space can be moved up and down, and an arc is generated between the tip part and each of the bottom part and the side part of the molten portion. Although molten metal of the welding wire and base material molten by heat of the arc tend to flow in a direction such that the buried space is closed and the tip part of the welding wire is buried, the molten metal is pushed back by force of an arc, with which the side part of the molten portion is irradiated from the tip part of the welding wire, and the tip part is stabilized in a state surrounded by the molten portion.

Moreover, although molten metal in buried arc welding may possibly wave largely, it is possible to finely vibrate the molten metal at a higher frequency than the large waving cycle and suppress large waving of the molten metal by periodically fluctuating the melting current with the above frequency, mean current and current amplitude, and it is also possible to realize single pass welding of a thick plate.

A welding method according to the present disclosure is a welding method of consumable electrode type, which feeds a welding wire to a welded part of a base material and supplies welding current to the welding wire so as to generate an arc between a tip part of the welding wire and the welded part and weld the base material, wherein the welding wire is fed at a speed, at which the tip part enters a space surrounded by a concave molten portion formed at the base material by an arc generated between the tip part and the welded part, and the welding current is periodically fluctuated, so that periodical fluctuation is achieved between a first state where an arc is generated between the tip part and a bottom part of the molten portion and a second state where an arc is generated between the tip part and a side part of the molten portion.

In the present disclosure, the tip part of the welding wire enters a buried space surrounded by a concave molten portion, and a buried arc is generated. Specifically, the tip part of the welding wire is put into a state surrounded by the molten portion, and the welding current is periodically fluctuated, so that the wire tip position in the buried space can be moved up and down, and an arc is generated between the tip part and each of the bottom part and the side part of the molten portion. Although molten metal of the welding wire and base material molten by heat of the arc tend to flow in a direction such that the buried space is closed and the tip part of the welding wire is buried, the molten metal is pushed back by force of an arc, with which the side part of the molten portion is irradiated from the tip part of the welding wire, and the tip part is stabilized in a state surrounded by the molten portion.

Moreover, although molten metal in buried arc welding may possibly wave largely, it is possible to achieve periodical fluctuation between a first state where an arc jumps to a bottom part of the concave molten portion and a second state where an arc jumps to a side part of the molten portion by periodically fluctuating the welding current, and it is also possible to suppress waving of the molten metal and to realize single pass welding of a thick plate.

A welding method according to the present disclosure achieves fluctuation between the first state and the second state at a frequency equal to or higher than 10 Hz and equal to or lower than 1,000 Hz.

It is possible with the present disclosure to finely vibrate molten metal at a higher frequency than a large waving cycle by achieving fluctuation between the first state and the second state at a frequency equal to or higher than 10 Hz and equal to or lower than 1,000 Hz, and it is also possible to suppress large waving of molten metal.

In a welding method according to the present disclosure, the first state includes a droplet transfer form of drop transfer, and the second state includes a droplet transfer form in which a liquid column formed at the tip part of the welding wire and an arc swing like a pendulum.

It is possible with the present disclosure to achieve periodical fluctuation between drop transfer, in which an arc jumps to a bottom part of a concave molten portion, and pendulum transfer by periodically fluctuating the welding current, and it is also possible to suppress waving of molten metal.

In a welding method according to the present disclosure, the first state includes a droplet transfer form of drop transfer, and the second state includes a droplet transfer form of rotating transfer.

It is possible with the present disclosure to achieve periodical fluctuation between drop transfer, in which an arc jumps to a bottom part of a concave molten portion, and rotating transfer, in which an arc jumps to a side part of a molten portion, by periodically fluctuating the welding current, and it is also possible to suppress waving of molten metal.

In a welding method according to the present disclosure, the first state includes a droplet transfer form, in which a liquid column formed at the tip part of the welding wire and an arc swing like a pendulum, and the second state includes a droplet transfer form of rotating transfer.

It is possible with the present disclosure to achieve periodical fluctuation between pendulum transfer, in which an arc jumps to a bottom part of a concave molten portion, and rotating transfer, in which an arc jumps to a side part of a molten portion, by periodically fluctuating the welding current, and it is also possible to suppress waving of molten metal.

In a welding method according to the present disclosure, the welding current is fluctuated in a manner such that the frequency of the welding current becomes equal to or higher than 10 Hz and equal to or lower than 1,000 Hz, the mean current becomes equal to or larger than 300 A, and the current amplitude becomes equal to or larger than 50 A.

With a welding condition of a frequency equal to or higher than 10 Hz and equal to or lower than 1,000 Hz, a mean current equal to or larger than 300 A and a current amplitude equal to or larger than 50 A, it is possible to effectively suppress waving of molten metal and realize single pass welding of a thick plate.

In a welding method according to the present disclosure, the frequency of the welding current is equal to or higher than 50 Hz and equal to or lower than 300 Hz, the mean current is equal to or larger than 300 A and equal to or smaller than 1,000 A, and the current amplitude is equal to or larger than 100 A and equal to or smaller than 500 A.

With a welding condition of a frequency of welding current equal to or higher than 50 Hz and equal to or lower than 300 Hz, a mean current equal to or larger than 300 A and equal to or smaller than 1,000 A and a current amplitude equal to or larger than 100 A and equal to or smaller than 500 A, it is possible to further effectively suppress waving of molten metal and realize single pass welding of a thick plate.

An arc welding device according to the present disclosure is an arc welding device of consumable electrode type, which comprises a wire feeding unit configured to feed a welding wire to a welded part of a base material and a power source unit configured to supply welding current to the welding wire and supplies welding current to the welding wire so as to generate an arc between a tip part of the welding wire and a welded part and weld the base material, wherein the wire feeding unit feeds the welding wire at a speed, at which the tip part enters a space surrounded by a concave molten portion formed at the base material by an arc generated between the tip part and the welded part, and the power source unit fluctuates the welding current in a manner such that the frequency of the welding current becomes equal to or higher than 10 Hz and equal to or lower than 1,000 Hz, the mean current becomes equal to or larger than 300 A, and the current amplitude becomes equal to or larger than 50 A.

With the present disclosure, the tip part of the welding wire enters a buried space surrounded by the concave molten portion, and a buried arc is generated. Although the tip part of the welding wire is put into a state surrounded by the molten portion and the molten metal may possibly wave largely as described above, it is possible to finely vibrate molten metal at a higher frequency than a large waving cycle by periodically fluctuating the welding current with the frequency, the mean current and the current amplitude so as to suppress large waving of molten metal, and it is also possible to realize single pass welding of a thick plate.

An arc welding device according to the present disclosure is an arc welding device of consumable electrode type, which comprises a wire feeding unit configured to feed a welding wire to a welded part of a base material and a power source unit configured to supply welding current to the welding wire and supplies welding current to the welding wire so as to generate an arc between a tip part of the welding wire and a welded part and weld the base material, wherein the wire feeding unit feeds the welding wire at a speed, at which the tip part enters a space surrounded by a concave molten portion formed at the base material by an arc generated between the tip part and the welded part, and the power source unit periodically fluctuates the welding current so that periodical fluctuation is achieved between a first state where an arc is generated between the tip part and a bottom part of the molten portion and a second state where an arc is generated between the tip part and a side part of the molten portion.

With the present disclosure, the tip part of the welding wire enters a buried space surrounded by the concave molten portion, and a buried arc is generated. Although the tip part of the welding wire is put into a state surrounded by the molten portion and the molten metal may possibly wave largely as described above, it is possible to achieve periodical fluctuation between the first state where an arc jumps to the bottom part of the concave molten portion and the second state where an arc jumps to the side part of the molten portion by periodically fluctuating the welding current so as to suppress waving of molten metal, and it is also possible to realize single pass welding of a thick plate.

Advantageous Effects of Invention

As is clear from the above description, it is possible with a welding method of the present disclosure to provide a welding method which makes it possible to improve the work efficiency of welding by achieving piercing welding in butt welding using GMA welding.

It is also possible with the present disclosure to suppress waving of molten metal in buried arc welding and prevent occurrence of disordering and hanging of a bead even in a case of gas shielded arc welding using large current equal to or larger than 300 A.

The above and further objects and features will more fully be apparent from the following detailed description with accompanying drawings.

BRIEF DESCRIPTION OF THE DRAWINGS

FIG. 18 A chart illustrating experimental result regarding stabilization of a bead shape and a buried space using pattern diagrams.

DETAILED DESCRIPTION

Figure 1:
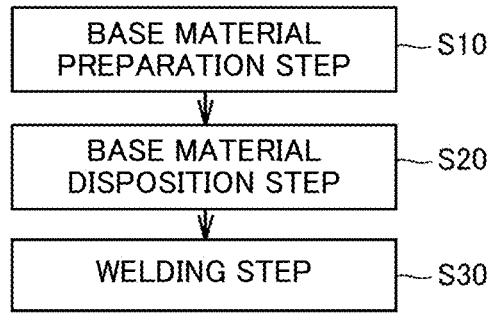
FIG. 1 A flowchart illustrating an outline of procedures of welding.

The following description will explain some embodiments of the present disclosure referring to the drawings. It is to be noted that the same reference signs will be attached to identical or corresponding components in the following drawings, and explanation thereof will not be repeated.

Embodiment 1

Figure 2:
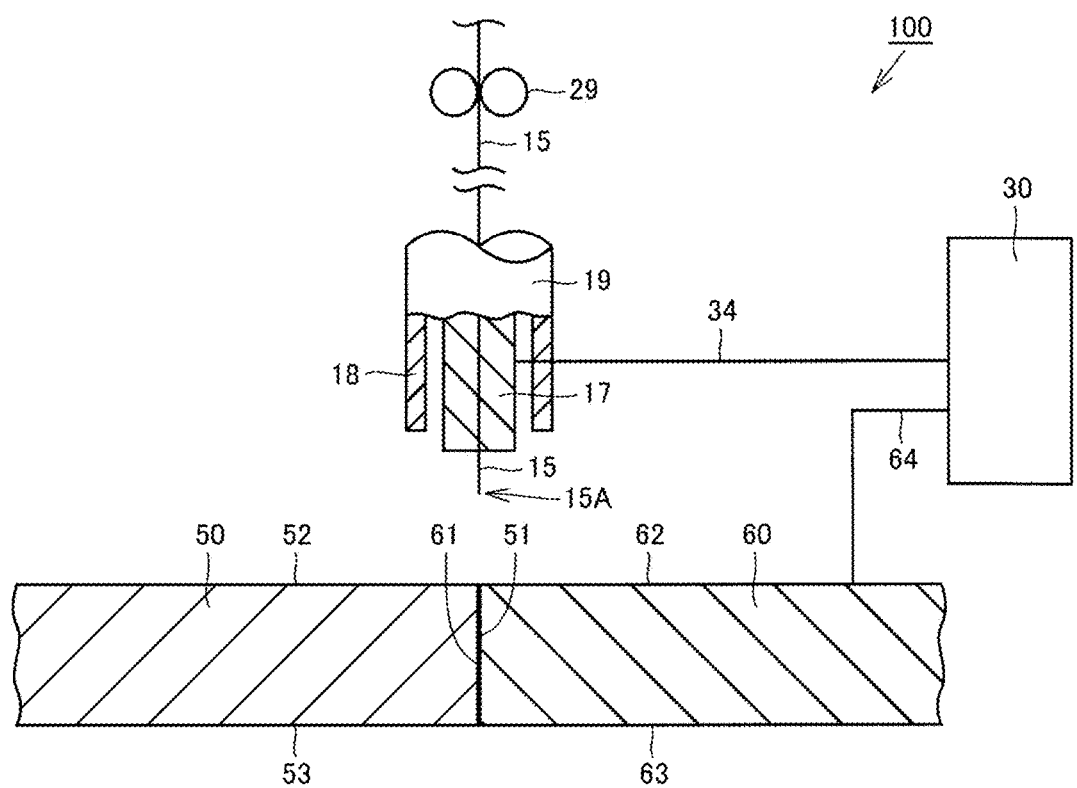
FIG. 2 A schematic drawing for explaining a welding method of Embodiment 1.

First, a welding method of Embodiment 1 will be described. Referring to FIG. 1, a base material preparation step is carried out as a step (S10) in the welding method of Embodiment 1. In this step (S10), a pair of base materials to be joined by welding are prepared. Specifically, referring to FIG. 2, a first base material 50 and a second base material 60 are prepared. The first base material 50 and the second base material 60 are steel plates made of steel such as mild steel, carbon steel for machine structure use, or alloy steel for machine structure use, for example. The thickness of each steel plate is equal to or larger than 9 mm and equal to or smaller than 30 mm, for example.

Next, a base material disposition step is carried out as a step (S20). In this step (S20), referring to FIG. 2, the first base material 50 and the second base material 60 prepared in step (S10) are set in a welding device 100. The welding device 100 is provided with a torch 19, a power source 30 and a wire feeding device 29. The torch 19 includes a contact tip 17, and a nozzle 18, which surrounds the contact tip 17 and has a hollow cylindrical shape. The contact tip 17 is made of electrically-conductive material (metal) such as copper alloy. The contact tip 17 guides a welding wire 15, which is filler material, while being in contact with the welding wire 15. That is, the welding wire 15 and the contact tip 17 are electrically connected with each other. The welding wire 15 functions as a consumable electrode. In this embodiment, the welding wire 15 is a solid wire. The diameter of the welding wire 15 is equal to or larger than 0.9 mm and equal to or smaller than 1.6 mm, for example.

A flow channel, through which shielding gas flows, is formed between the nozzle 18 and the contact tip 17. The welding wire 15 is positioned in an area including a central axis of the nozzle 18. The wire feeding device 29 feeds the welding wire 15 into the nozzle 18. The power source 30 is electrically connected with the contact tip 17 via wiring 34. The power source 30 is electrically connected with the second base material 60 via wiring 64.

The first base material 50 has one main surface 52, the other main surface 53 and a first end face 51. The second base material 60 has one main surface 62, the other main surface 63 and a second end face 61. The first base material 50 and the second base material 60 are disposed in a manner such that the first end face 51 and the second end face 61 face each other. The first base material 50 and the second base material 60 are disposed in a manner such that the first end face 51 and the second end face 61 come into contact with each other. No beveling edge is formed at the first base material 50 and the second base material 60. That is, the first end face 51 and the second end face 61 are parallel to each other over the whole area in the thickness direction.

Figure 3:
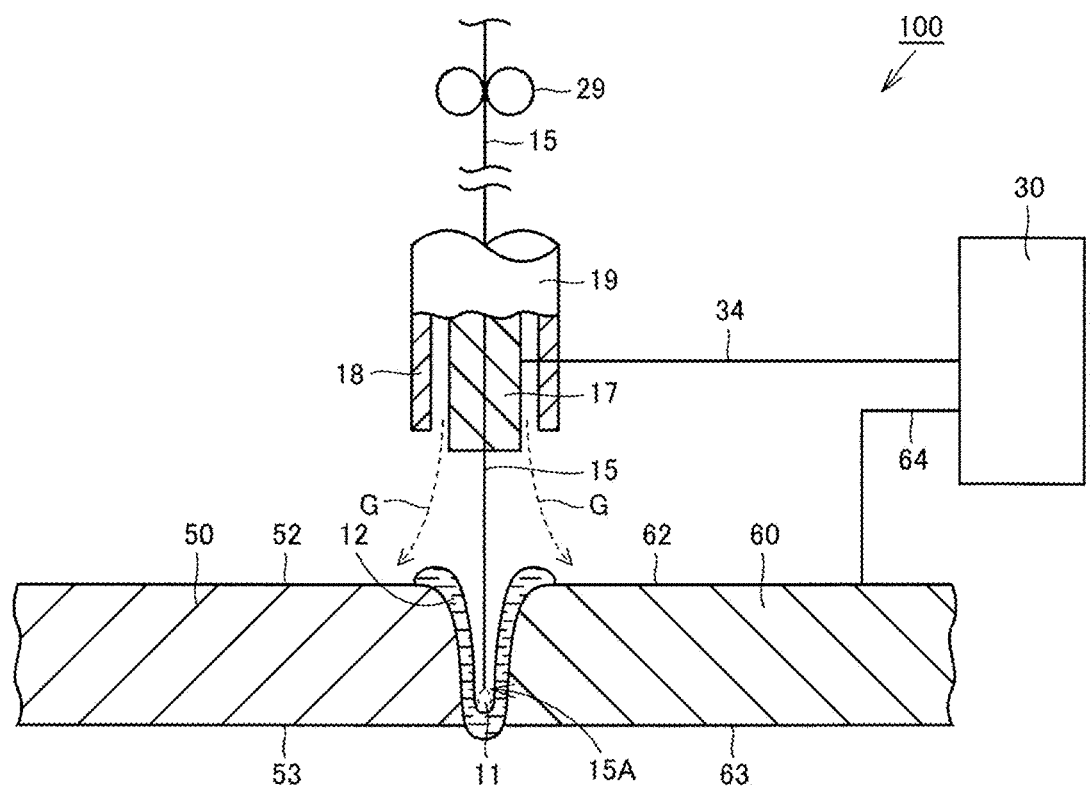
FIG. 3 A schematic drawing for explaining a welding method of Embodiment 1.

Next, a welding step is carried out as step (S30). In this step (S30), the first base material 50 and the second base material 60, which are disposed in step (S20), are welded together using GMA welding. Specifically, referring to FIG. 3, an arc 11 is formed between the welding wire 15 and each of the first base material 50 and the second base material 60 when the power source 30 applies voltage between each of the first base material 50 and the second base material 60 and the welding wire 15 while the wire feeding device 29 feeds the welding wire 15. At this time, shielding gas such as carbon dioxide gas, for example, is supplied into the nozzle 18 and flows through a space between the contact tip 17 and the inner circumferential surface of the nozzle 18. Shielding gas is then discharged from an outlet of the nozzle 18 along the arrows G, and the arc 11 is isolated from outside air. A molten region 12 is formed at the first base material 50 and the second base material 60 by heat of the arc 11 formed in such a manner.

At this time, since an arc 11 is formed in a state (a buried arc state) where the welding wire 15 penetrates into a region surrounded by the molten region 12, the molten region 12 is formed to pierce through the first base material 50 and the second base material 60 in the thickness direction. That is, an arc 11 is formed in a state where a tip 15A of the welding wire 15, which penetrates from the side of the one main surface 52 of the first base material 50 and the one main surface 62 of the second base material 60, is positioned in a region surrounded by the molten region 12. The molten region 12 is exposed at the other main surface 53 of the first base material 50 and the other main surface 63 of the second base material 60.

Since the torch 19 moves relative to the first base material 50 and the second base material 60, a region where a molten region 12 is formed moves. A molten region 12, which has already been formed, is solidified with lowering of the temperature. A molten region 12 is sequentially formed along an extending direction of a region to be welded (a region where the first end face 51 and the second end face 61 face each other), and the formed molten region 12 is solidified, so that welding of the first base material 50 and the second base material 60 in this embodiment is completed.

In step (S30) in a welding method of this embodiment, an arc 11 is formed in a state where the welding wire 15 penetrates into a region surrounded by the molten region 12, so that the molten region 12 is formed to pierce through the first base material 50 and the second base material 60 in the thickness direction. Accordingly, it is possible with a welding method of this embodiment to improve the work efficiency of welding by achieving piercing welding in butt welding using GMA welding.

In the above step (S30), it is preferable that the feed speed of the welding wire 15 is equal to or higher than 30 m/min. This makes it easy to maintain a buried arc state.

It is to be noted that it is also possible to set the feed speed of the welding wire 15 within a range of 5 to 100 m/min depending on the welding condition.

In the above step (S30), it is preferable that the first base material 50 and the second base material 60 are welded together in a state where voltage reduction with respect to current increase of 100 A is equal to or larger than 4 V and equal to or smaller than 20 V. By setting the external characteristic (the output characteristic) of the power source 30 in such a manner, it becomes easy to maintain a buried arc state. It is preferable that the above voltage reduction is equal to or larger than 5 V. Moreover, it is preferable that the above voltage reduction is equal to or smaller than 15 V.

Embodiment 2

Next, a welding method of Embodiment 2, which is another embodiment of the present invention, will be described. A welding method of Embodiment 2 is carried out basically in a manner similar to the above case of Embodiment 1, and a similar effect is obtained. However, a welding method of Embodiment 2 is different from the case of Embodiment 1 in the shape of end faces of base materials.

Figure 4:
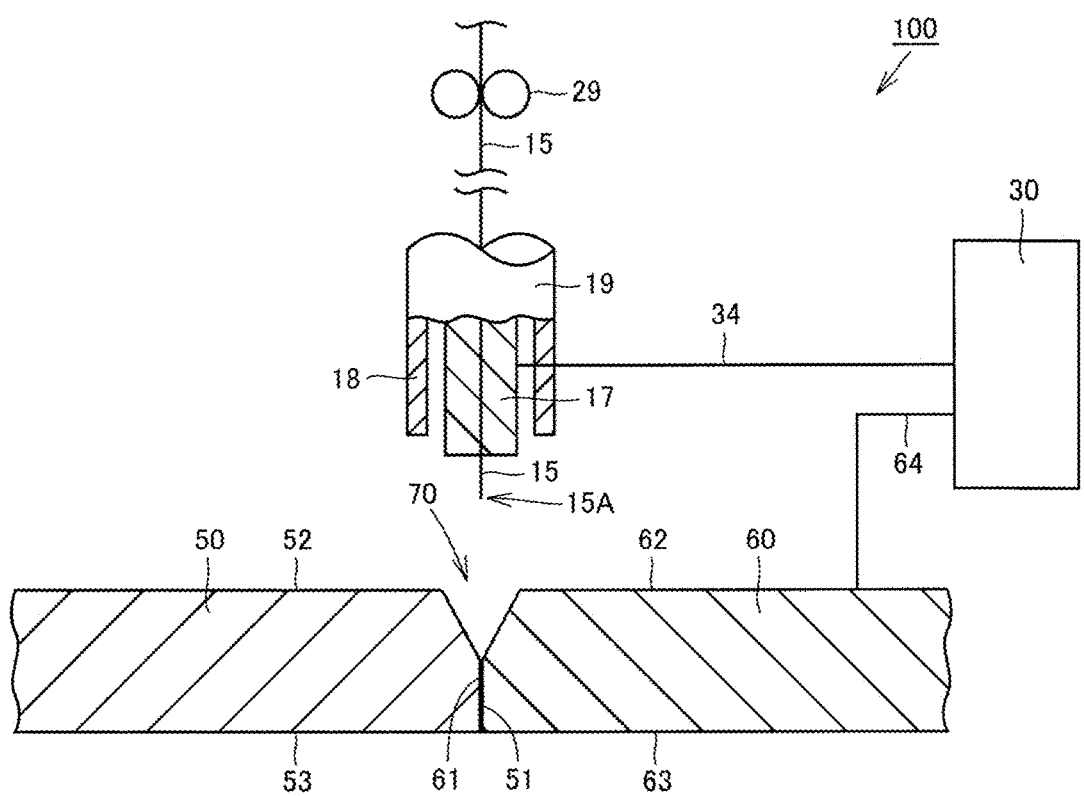
FIG. 4 A schematic drawing for explaining a welding method of Embodiment 2.

Referring to FIG. 4, in a welding method of Embodiment 2, a first base material 50 and a second base material 60 having a beveling edge 70 formed thereon are prepared in step (S10). The beveling edge 70 is formed on the one main surface 52, 62 side of the first base material 50 and the second base material 60. The beveling edge 70 is formed in a manner such that a corner part of the first base material 50 where a first end face 51 and the one main surface 52 are connected with each other and a corner part of the second base material 60 where a second end face 61 and the one main surface 62 are connected each other are removed. Accordingly, when the first base material 50 and the second base material 60 are disposed in a manner such that the first end face 51 and the second end face 61 face each other in step (S20), the interval between the first base material 50 and the second base material 60 in a region corresponding to the beveling edge 70 increases as the distance from the one main surfaces 52 and 62 decreases.

Figure 5:
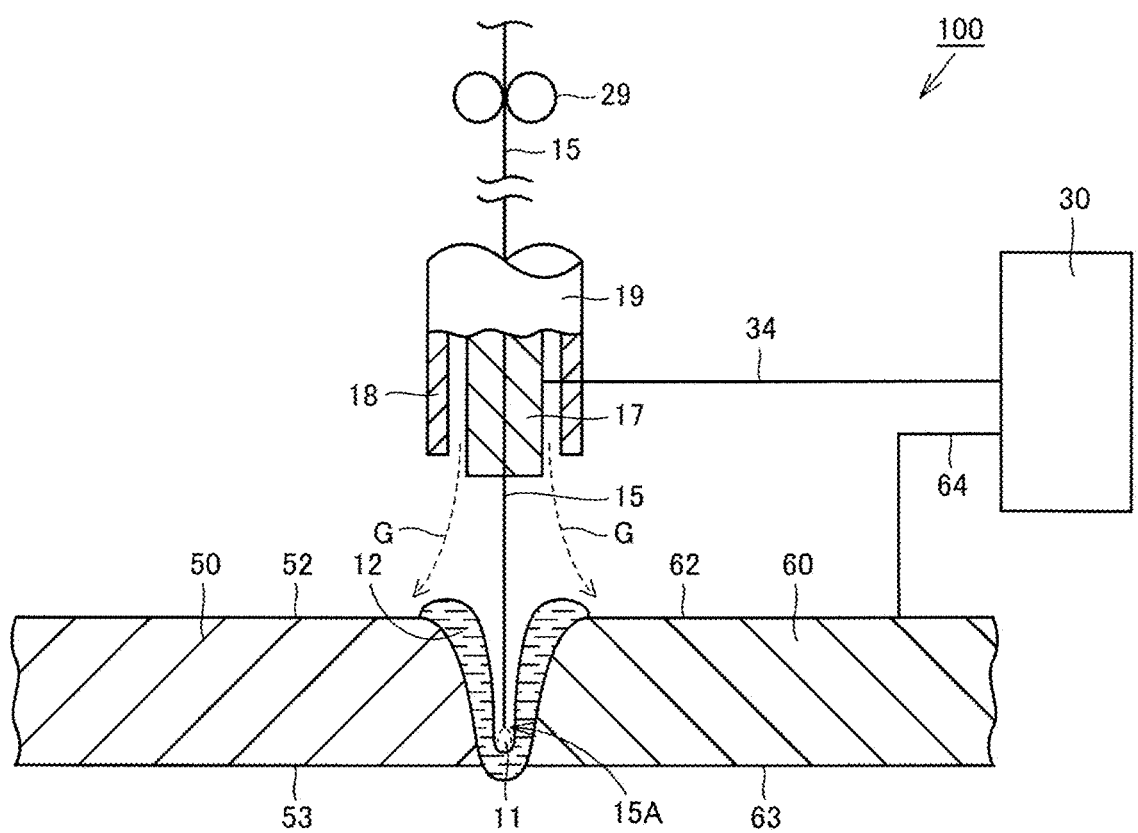
FIG. 5 A schematic drawing for explaining a welding method of Embodiment 2.

In step (S30), referring to FIG. 5, the first base material 50 and the second base material 60 are welded together in a state where the beveling edge 70 is formed. At this time, a region corresponding to the beveling edge 70 is filled by welding. That is, the amount of the welding wire 15 as filler material to be supplied to the molten region 12 becomes larger than the above case of Embodiment 1 wherein no beveling edge 70 is formed.

Since the beveling edge 70 is formed as described above, it becomes easy to achieve piercing welding in step (S30). Accordingly, a welding method of this embodiment is suitable in a case where a first base material 50 and a second base material 60 each having a large thickness are welded together.

Examples

Experiments were conducted to confirm that it is possible with a welding method of the present invention to achieve piercing welding in butt welding using GMA welding. A specific experimental method is as follows.

First, a plurality of steel plates having different thicknesses were prepared as base materials. Next, referring to FIG. 2, two steel plates having the same thickness were set in the welding device 100 in a manner such that end faces of the steel plates come into contact with each other without forming a beveling edge as with the above case of Embodiment 1. The feed speed of the welding wire 15 was then varied while a buried arc state is maintained under a condition of a constant welding speed, and a thickness of a steel plate with which piercing welding can be realized (a plate thickness which enables piercing welding) was examined. The current value, the voltage value and the wire projecting length were adjusted to values suitable for maintaining a buried arc state at each wire feed speed. Moreover, voltage reduction with respect to current increase of 100 A, which is the external characteristic of the power source 30, was set to 10 to 20 V or 20 V. A solid wire having a diameter of 1.2 mm was employed as the welding wire 15. Conditions and results of experiments are represented in Table 1.

TABLE 1

| | Wire feed speed (m/min) | | | |
|---|---|---|---|---|
| | 25 | 30 | 40 | 50 |
| Current value (A) | 400 | 450 | 550 | 770 |
| Voltage value (V) | 35 | 39 | 52 | 57 |
| External characteristic value (V) | −10~−20 | −10~−20 | −20 | −20 |

TABLE 1-continued

| | Wire feed speed (m/min) | | | |
|---|---|---|---|---|
| | 25 | 30 | 40 | 50 |
| Wire projecting length (mm) | 25 | 25 | 25 | 15 |
| Welding speed (cm/min) | 30 | 30 | 30 | 30 |
| Plate thickness which enables piercing welding (mm) | 9 | 12 | 16 | 19 |

Table 1 shows thicknesses of steel plates which were confirmed to enable piercing welding by maintaining a buried arc state at various wire feed speeds. It is to be noted that a negative value of an external specific value in Table 1 means a state where voltage lowered with respect to current increase of 100 A. For example, a state where an external specific value is −20 V means that the voltage lowered by 20 V with respect to increase of welding current of 100 A.

Referring to Table 1, it is confirmed that a buried arc state is maintained and piercing welding is achieved, by adjusting a current value, a voltage value and the like depending on a wire feed speed. Moreover, the plate thickness (the thickness of the base material) which enables piercing becomes large when the wire feed speed is increased. It can be said that it is preferable to set the wire feed speed equal to or higher than 30 m/min, in order to achieve piercing welding for a steel plate having a thickness equal to or larger than 9 mm.

Embodiment 3

Next, a welding method of Embodiment 3, which is another embodiment of the present invention, will be described. A welding method of Embodiment 3 is carried out basically in a manner similar to the above case of Embodiment 1, and a similar effect is obtained. However, a welding method of Embodiment 3 is different from the case of Embodiment 1 in a welding step.

In a welding method of Embodiment 3, a base material preparation step (S10), a base material disposition step (S20) and a welding step (S30) are carried out in procedures similar to Embodiment 1 illustrated in FIG. 1.

Figure 6A:
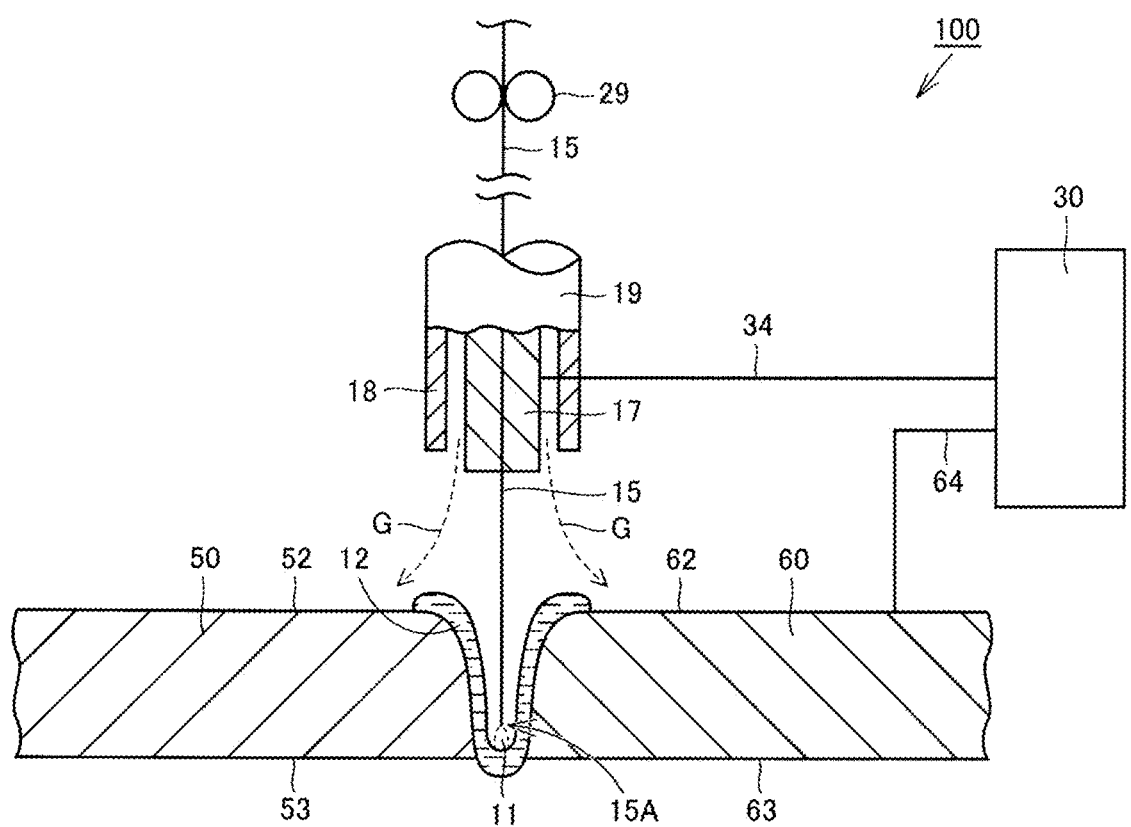
FIG. 6A A schematic drawing illustrating a state where a welding wire penetrates deeply in a welding step of Embodiment 3.
Figure 6B:
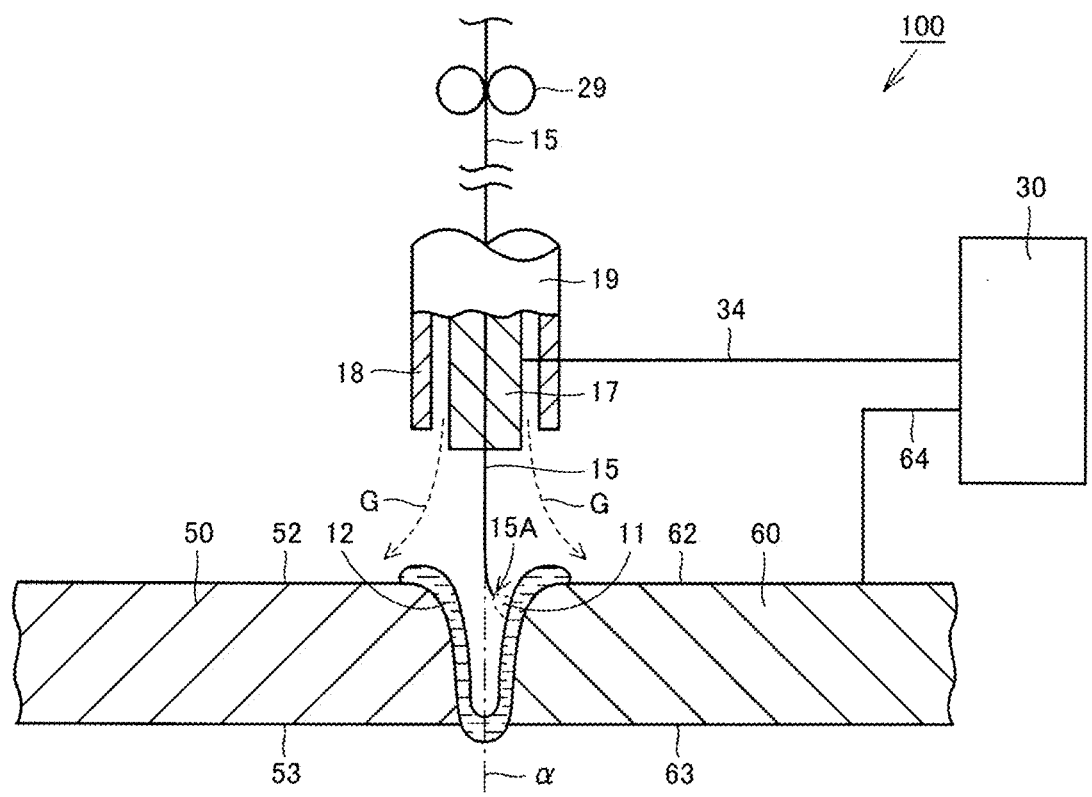
FIG. 6B A schematic drawing illustrating a state where a welding wire penetrates shallowly and the transfer form of a droplet is rotating transfer in a welding step of Embodiment 3.
Figure 7:
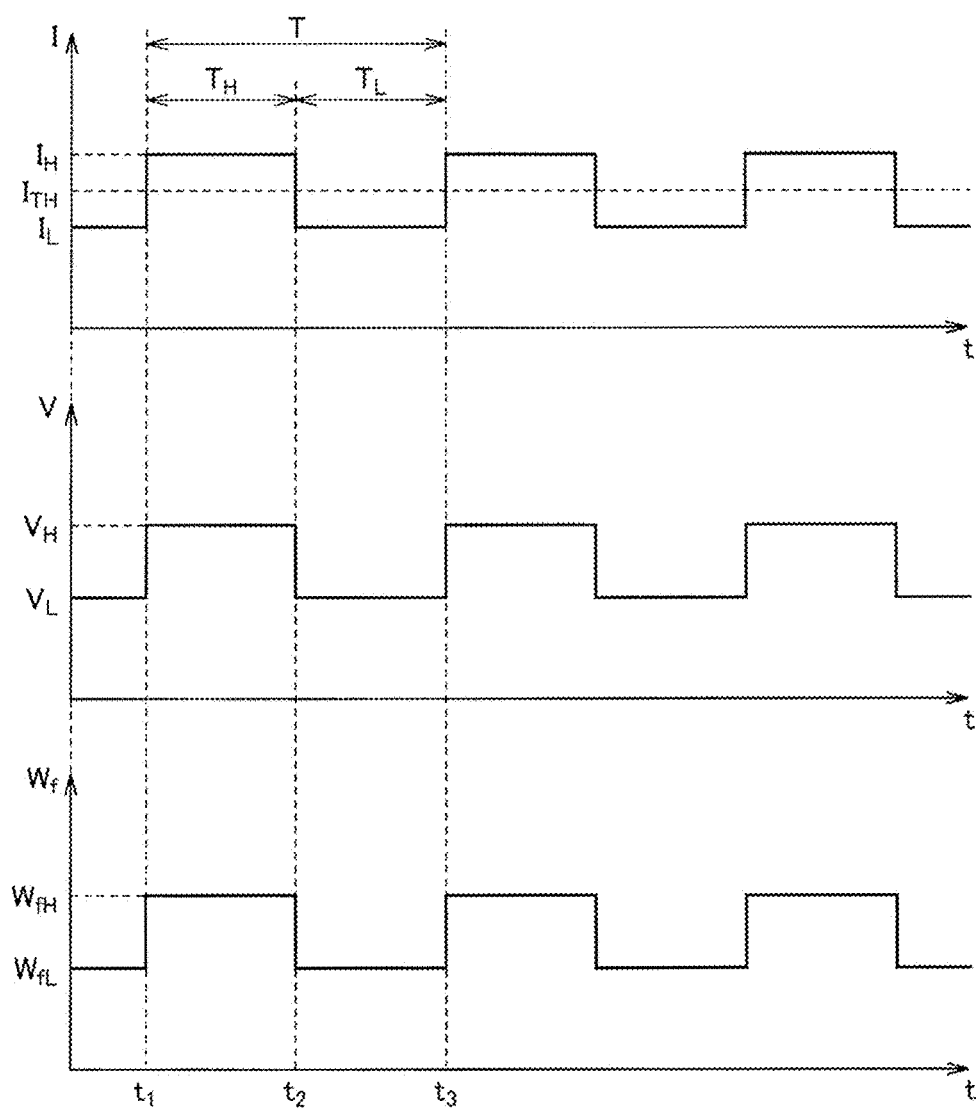
FIG. 7 A timing chart illustrating a control state of current, voltage and feed speed of a welding wire.

FIG. 6A is a schematic drawing illustrating a state where the welding wire 15 penetrates deeply in a welding step of Embodiment 3, FIG. 6B is a schematic drawing illustrating a state where a welding wire penetrates shallowly and a droplet transfer form is rotating transfer in a welding step of Embodiment 3, and FIG. 7 is a timing chart illustrating a control state of a current, a voltage and a feed speed of a welding wire.

In the welding step (S30), specifically referring to FIGS. 6A and 6B, an arc 11 is formed between the welding wire 15 and each of the first base material 50 and the second base material 60 when the power source 30 applies voltage between each of the first base material 50 and the second base material 60 and the welding wire 15 while the wire feed device 29 feeds the welding wire 15.

At this time, an arc 11 is formed while the position of the tip 15A of the welding wire 15 reciprocates between a first depth and a second depth, which is deeper than the first depth, in the thickness direction of the first base material 50 and the second base material 60 in a state (a buried arc state) where the welding wire 15 penetrates into a region surrounded by the molten region 12, so that the molten region 12 is formed to pierce through the first base material 50 and the second base material 60 in the thickness direction. That is, an arc 11 is formed while the position of the tip 15A reciprocates in the thickness direction of the first base material 50 and the second base material 60 in a state where the tip 15A of the welding wire 15, which penetrates from the side of the one main surface 52 of the first base material 50 and the one main surface 62 of the second base material 60, is positioned in a region surrounded by the molten region 12. The molten region 12 is exposed at the other main surface 53 of the first base material 50 and the other main surface 63 of the second base material 60.

A further specific control method will be described referring to FIGS. 6A, 6B and 7. In FIG. 7, the horizontal axis corresponds to time t. Moreover, the vertical axis in FIG. 7 corresponds to welding current I, welding voltage V and feed speed $W_f$ of the welding wire 15. Referring to FIGS. 6A, 6B and 7, the current I is controlled to alternately repeat a state $I_L$, which is smaller than a threshold current $I_{TH}$, and a state $I_H$, which is larger than $I_{TH}$. From a time point $t_1$ to a time point $t_2$ (a time period $T_H$) when the current I is in the $I_H$ state, the voltage V is $V_H$, and the feed speed $W_f$ is set to $W_{fH}$. From the time point $t_2$ to a time point $t_3$ (a time period $T_L$) when the current I is in the $I_L$ state, the voltage V is set to $V_L$, which is smaller than $V_H$, and the feed speed $W_f$ is $W_{fL}$, which is lower than $W_{fH}$. The sum of the time period $T_H$ and the time period $T_L$ is a time period T per one cycle. The reciprocal 1/T of T is a frequency. The frequency 1/T can be equal to or higher than 0.2 Hz and equal to or lower than 2 Hz, for example.

In a state where the current I is smaller than the threshold current $I_{TH}$, obtained is a state where the welding wire 15 penetrates deeply (to a second depth) in the thickness direction of the first base material 50 and the second base material 60 as illustrated in FIG. 6A. At this time, the transfer form of droplet, which is formed by melting the welding wire 15, to the molten region 12 becomes a state other than rotating transfer, e.g., a state of drop transfer, or a state of transfer (pendulum transfer) in a state where the tip 15A of the welding wire 15 moves like a pendulum. On the other hand, in a state where the current I is larger than the threshold current $I_{TH}$, obtained is a state where the welding wire 15 penetrates shallowly (to a first depth) in the thickness direction of the first base material 50 and the second base material 60 as illustrated in FIG. 6B. At this time, the transfer form of droplet, which is formed by melting the melting wire 15, to the molten region 12 becomes a state of rotating transfer.

In the state of rotating transfer, a region close to the tip 15A of the welding wire 15 is curved far from an axis α along the thickness direction of the first base material 50 and the second base material 60. In addition, the tip 15A of the welding wire 15 rotates on the axis α. Accordingly, an arc to be formed rotates on the axis α. Since the state of rotating transfer is achieved in a state where the welding wire 15 penetrates shallowly, heat of the arc 11 is easily supplied to a region (a region close to one main surface 52 of the first base material 50 and one main surface 62 of the second base material 60) where occurrence of overlap is concerned.

Since the torch 19 moves relative to the first base material 50 and the second base material 60, a region where a molten region 12 is formed moves. A molten region 12, which has already been formed, is solidified with lowering of the temperature. A molten region 12 is sequentially formed along an extending direction of a region to be welded (a region where the first end face 51 and the second end face 61 face each other), and the formed molten region 12 is solidified, so that welding of the first base material 50 and the second base material 60 in this embodiment is completed.

In a welding method of this embodiment, an arc 11 is formed while the position of the tip 15A of the welding wire 15 reciprocates between the first depth and the second depth, which is deeper than the first depth, in the thickness direction of the first base material 50 and the second base material 60 in a state where the welding wire 15 penetrates into a region surrounded by the molten region 12, so that the molten region 12 is formed to pierce through the first base material 50 and the second base material 60 in the thickness direction.

At this time, a state where the welding wire 15 penetrates shallowly (to the second depth) in the thickness direction of the first base material 50 and the second base material 60 and the transfer form of droplet, which is formed by melting the welding wire 15, to the molten region 12 is a state of rotating transfer, and a state where the welding wire 15 penetrates deeply (to the second depth) and the transfer form is a state other than rotating transfer are alternately repeated. Since an arc 11 is formed in a state where the welding wire 15 penetrates deeply, heat of the arc 11 is supplied to a region close to the other main surface 53 of the first base material 50 and the other main surface 62 of the second base material 60. Accordingly, it becomes easy to achieve piercing welding. On the other hand, since a state of rotating transfer is achieved in a state where the welding wire 15 penetrates shallowly, heat of the arc 11 is easily supplied to a region (a region close to the one main surface 52 of the first base material 50 and the one main surface 62 of the second base material 60) where occurrence of overlap is concerned. Accordingly, occurrence of overlap is suppressed. In addition, since these states are alternately repeated, it is possible to achieve piercing welding while suppressing occurrence of overlap. Accordingly, it is possible with a welding method of this embodiment to improve the work efficiency of welding by achieving piercing welding in butt welding using GMA welding.

In the above step (S30), it is preferable that the feed speed of the welding wire 15 is set equal to or higher than 30 m/min. This makes it easy to maintain a buried arc state.

Embodiment 4

Next, a welding method of Embodiment 4, which is another embodiment of the present invention, will be described. A welding method of Embodiment 4 is carried out basically in a manner similar to the above case of Embodiment 3, and a similar effect is obtained. However, a welding method of Embodiment 4 is different from the case of Embodiment 3 in the shape of end faces of base materials.

Since the shape of end faces of base materials is similar to Embodiment 2, a welding method of Embodiment 4 will be described suitably referring to FIG. 4. Moreover, FIG. 8A is a schematic drawing illustrating a state where the welding wire 15 penetrates deeply in a welding step of Embodiment 4, and FIG. 8B is a schematic drawing illustrating a state where the welding wire 15 penetrates shallowly and the transfer form of a droplet is rotating transfer in a welding step of Embodiment 4.

Referring to FIG. 4, in a welding method of Embodiment 4, a first base material 50 and a second base material 60 having a beveling edge 70 formed thereon are prepared in step (S10). A beveling edge 70 is formed on the one main surfaces 52, 62 side of the first base material 50 and the second base material 60. The beveling edge 70 is formed in a manner such that a corner part of the first base material 50 where a first end face 51 and the one surface 52 are connected with each other and a corner part of the second base material 60 where a second end face 61 and the one main surface 62 are connected with each other are removed. Accordingly, when the first base material 50 and the second base material 60 are disposed in a manner such that the first end face 51 and the second end face 61 face each other in step (S20), the interval between the first base material 50 and the second base material 60 in a region corresponding to the beveling edge 70 increases as the distance from the one main surfaces 52 and 62 decreases.

Figure 8A:
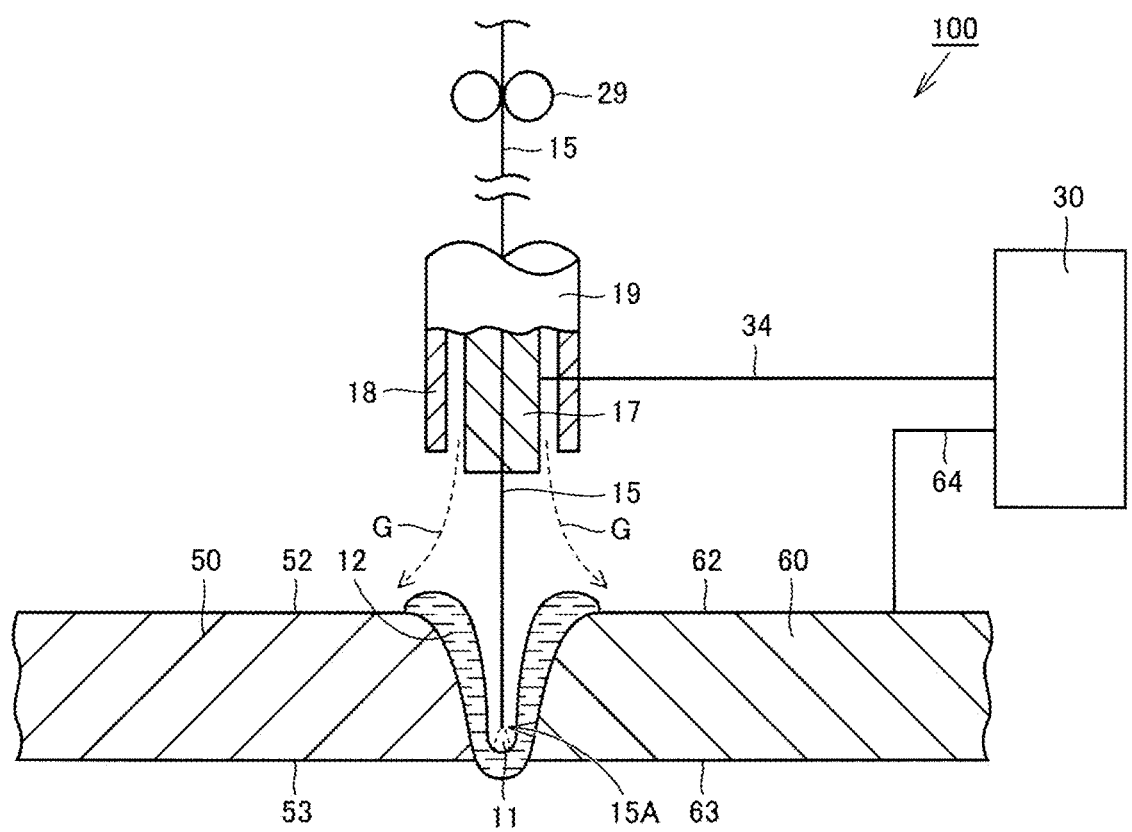
FIG. 8A A schematic drawing illustrating a state where a welding wire penetrates deeply in a welding step of Embodiment 4.
Figure 8B:
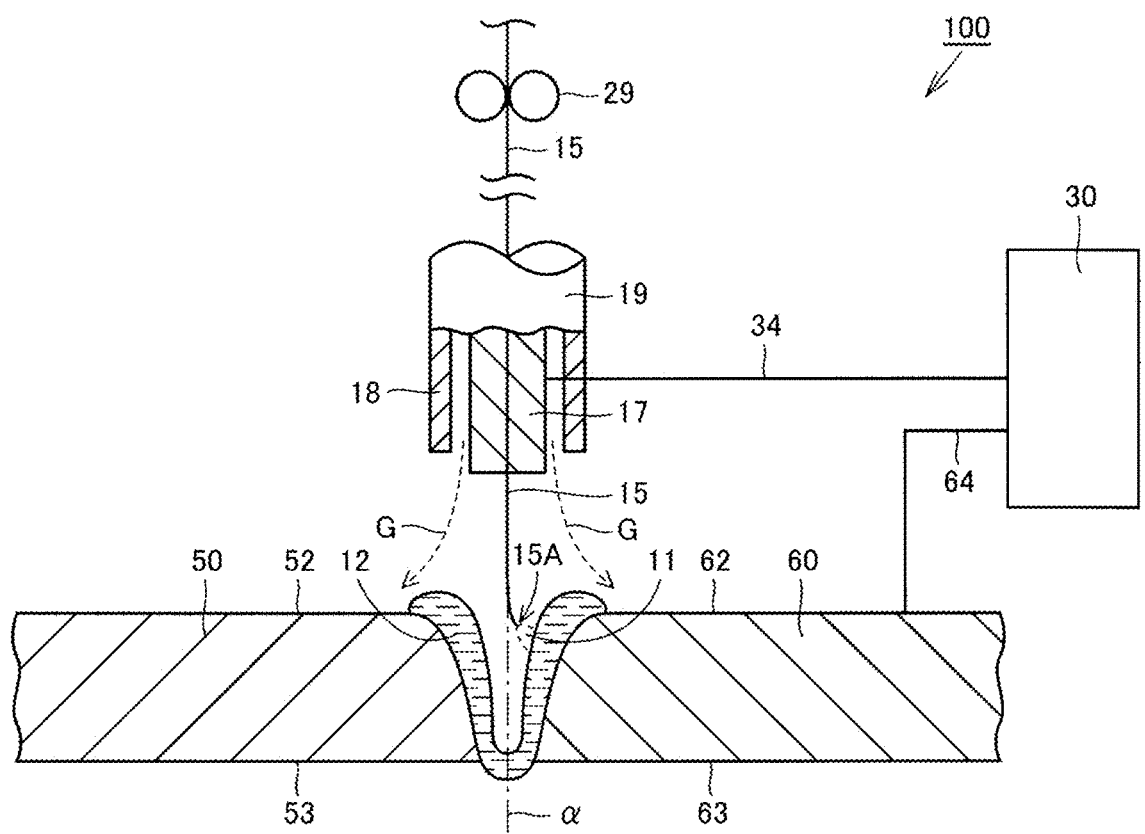
FIG. 8B A schematic drawing illustrating a state where a welding wire penetrates shallowly and the transfer form of a droplet is rotating transfer in a welding step of Embodiment 4.

In step (S30), referring to FIGS. 8A and 8B, the first base material 50 and the second base material 60 are welded together in a state where the beveling edge 70 is formed. At this time, a region corresponding to the beveling edge 70 is filled by welding. That is, the amount of the welding wire 15 as filler material supplied to the molten region 12 becomes larger than the above case of Embodiment 3 wherein no beveling edge 70 is formed.

Since the beveling edge 70 is formed as described above, it becomes easy to achieve piercing welding in step (S30). Accordingly, a welding method of this embodiment is suitable in a case where a first base material 50 and a second base material 60 each having a large thickness are welded together.

Although the above embodiment has described a method of reciprocating the position of the tip of a welding wire in the thickness direction of base materials by increasing the welding current, the welding voltage and the feed speed of the welding wire so as to achieve a state where the welding wire penetrates shallowly and decreasing the welding current, the welding voltage and the feed speed of the welding wire so as to achieve a state where the welding wire penetrates deeply, a welding method of the present invention is not limited to this. For example, the position of the tip of a welding wire may be reciprocated in the thickness direction of base materials by increasing the feed speed of the welding wire and the welding current under a constant welding voltage so as to achieve a state where the welding wire penetrates deeply and decreasing the feed speed of the welding wire and the welding current so as to achieve a state where the welding wire penetrates shallowly.

Examples

Experiments were conducted to confirm that it is possible with a welding method of the present invention to achieve piercing welding in butt welding using GMA welding. A specific experimental method is as follows.

First, two steel plates each having a thickness of 12 mm were prepared as base materials. Next, referring to FIG. 2, the two steel plates were set in the welding device 100 in a manner such that end faces thereof face each other without forming a beveling edge as with the above case of Embodiment 3. In addition, welding was carried out under conditions represented in Table 2.

TABLE 2

|  | Wire feed speed (m/min) | |
| --- | --- | --- |
|  | 50 | 60 |
| Current value (A) | 620 | 700 |
| Voltage value (V) | 55 | 64 |

TABLE 2-continued

| | Wire feed speed (m/min) | |
|---|---|---|
| | 50 | 60 |
| Transfer form of droplet | Drop transfer or pendulum transfer | Rotating transfer |
| Penetration depth of welding wire | Deep | Shallow |
| Frequency (Hz) | 1 | |
| Welding speed (cm/min) | 30 | |

It was confirmed from observation of steel plates joined by welding that piercing welding was achieved. Moreover, no occurrence of overlap was confirmed. It is confirmed from the above experimental results that it is possible with a welding method of the present invention to achieve piercing welding while suppressing occurrence of overlap, since a state where the welding wire 15 penetrates deeply and a state where the welding wire 15 penetrates shallowly are alternately repeated.

Embodiment 5

Next, a welding method of Embodiment 5, which is another embodiment of the present invention, will be described. A welding method of Embodiment 5 is carried out basically in a manner similar to the above case of Embodiment 1, and a similar effect is obtained. However, a welding method of Embodiment 5 is different from the case of Embodiment 1 in a welding step.

In a welding method of Embodiment 5, a base material preparation step (S10), a base material disposition step (S20) and a welding step (S30) are carried out in procedures similar to Embodiment 1 illustrated in FIG. 1.

Figure 9A:
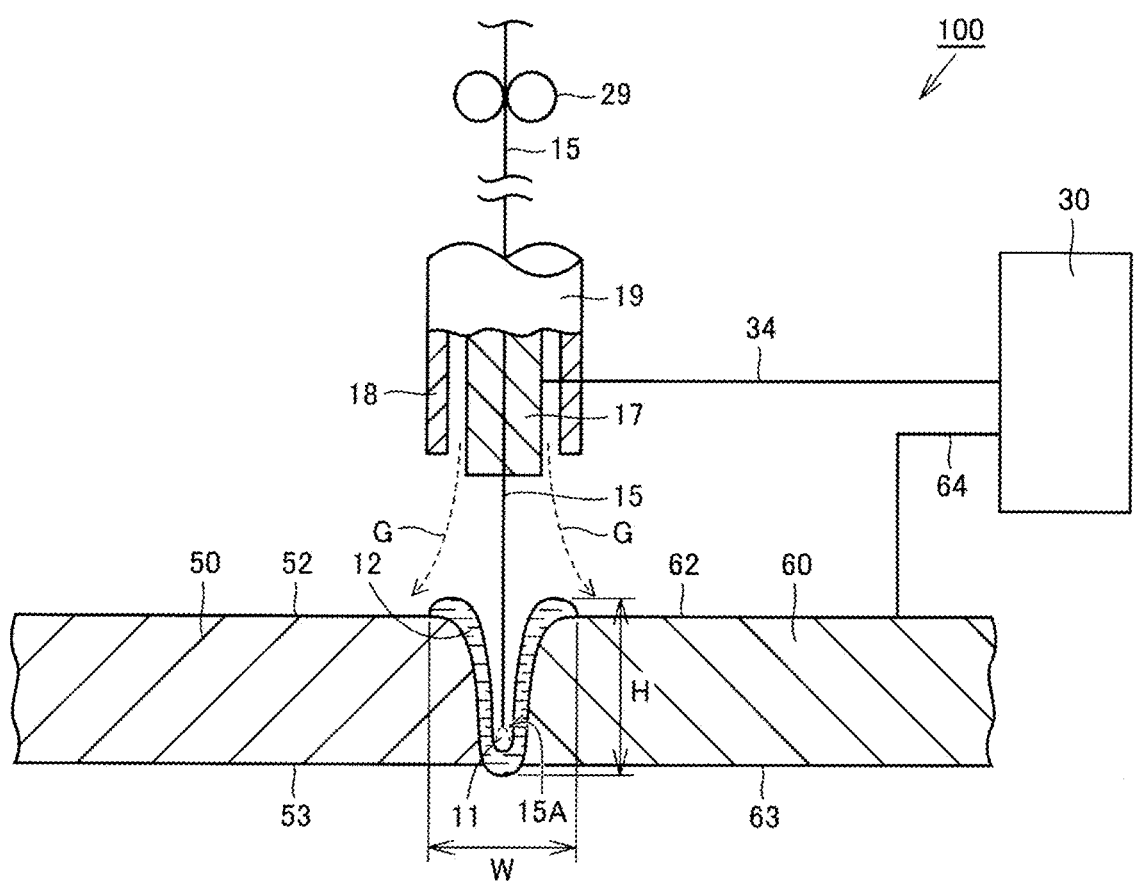
FIG. 9A A schematic drawing illustrating a buried arc state in a welding step of Embodiment 5.
Figure 9B:
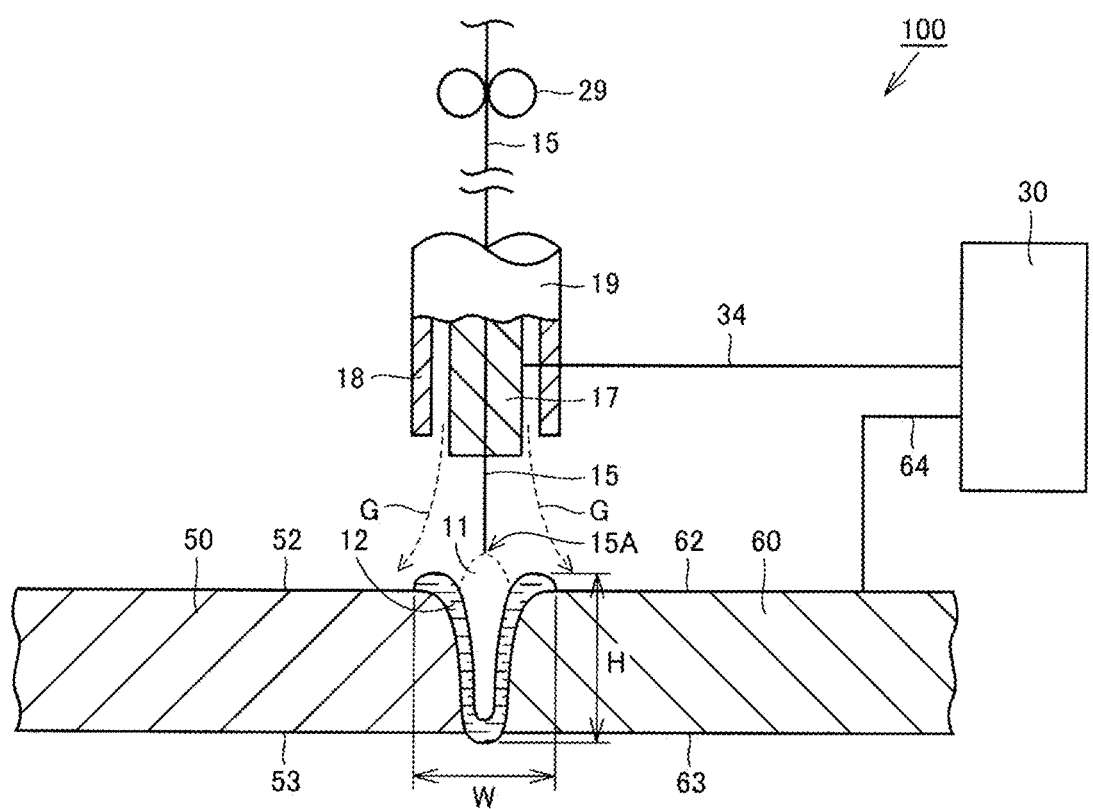
FIG. 9B A schematic drawing illustrating a state where a buried arc is canceled in a welding step of Embodiment 5.
Figure 10:
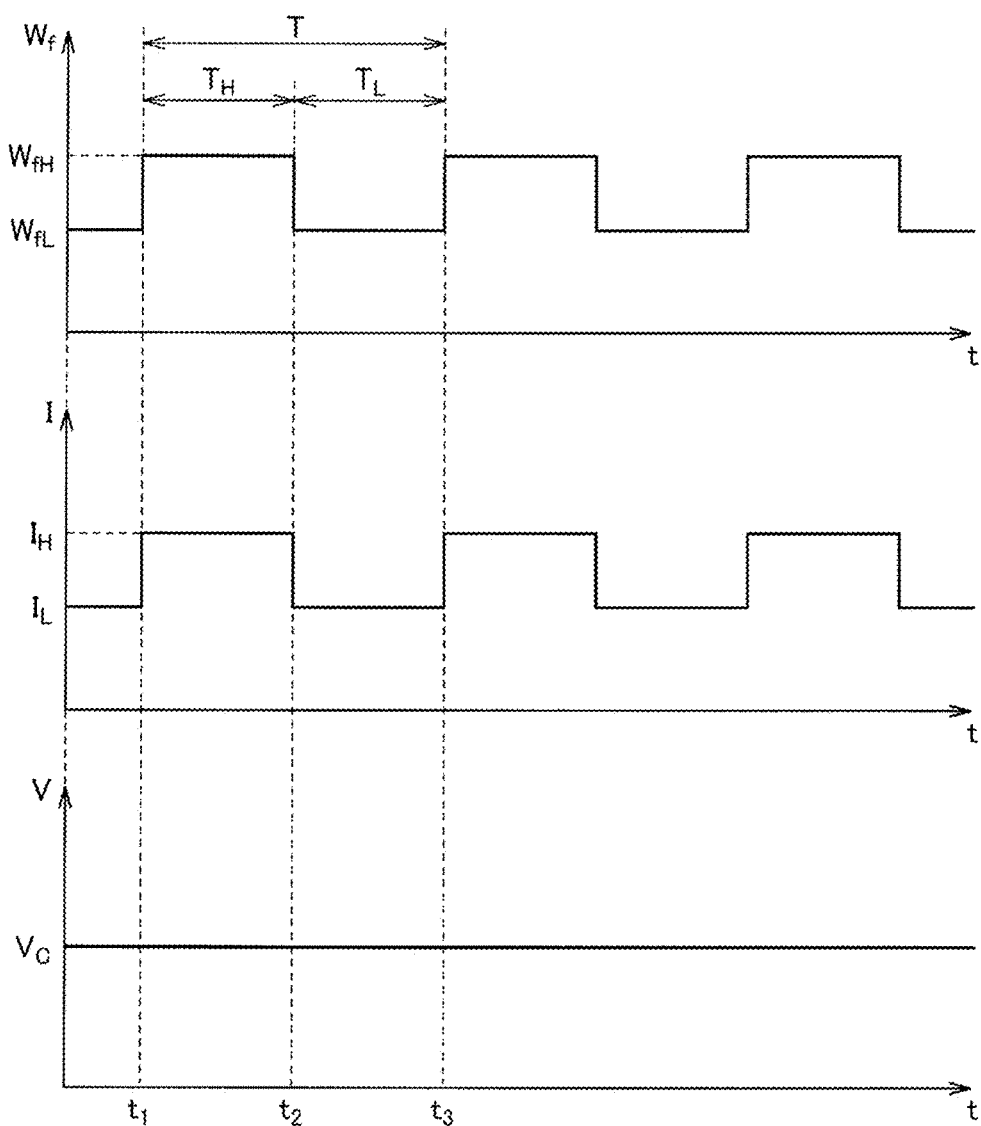
FIG. 10 A timing chart illustrating a control state of feed speed of a welding wire, current and voltage.

FIG. 9A is a schematic drawing illustrating a buried arc state of a welding step of Embodiment 5, FIG. 9B is a schematic drawing illustrating a state where a buried arc is cancelled in a welding step of Embodiment 5, and FIG. 10 is a timing chart illustrating a control state of the feed speed of the welding wire 15, the current and the voltage.

In the welding step (S30), specifically referring to FIGS. 9A and 9B, an arc 11 is formed between the welding wire 15 and each of the first base material 50 and the second base material 60 when the power source 30 applies voltage between each of the first base material 50 and the second base material 60 and the welding wire 15 while the wire feeding device 29 feeds the welding wire 15.

At this time, an arc 11 is formed while a state (a buried arc state) where the welding wire 15 penetrates into a region surrounded by the molten region 12 and a state (a state where a buried arc is cancelled) where the welding wire 15 is out of a region surrounded by the molten region 12 are alternately repeated, so that the molten region 12 is formed to pierce through the first base material 50 and the second base material 60 in the thickness direction. That is, an arc 11 is formed while a state where the tip 15A of the welding wire 15 is positioned in a region surrounded by the molten region 12 and a state where the tip 15A is positioned outside a region surrounded by the molten region 12 are alternately repeated. The molten region 12 is exposed at the other main surface 53 of the first base material 50 and the other main surface 63 of the second base material 60.

A further specific control method will be described referring to FIGS. 9A, 9B and 10. In FIG. 10, the horizontal axis corresponds to time t. Moreover, the vertical axis in FIG. 10 corresponds to feed speed $W_f$ of the welding wire 15, welding current I and welding voltage V. Referring to FIGS. 9A, 9B and 10, the feed speed $W_f$ is controlled to alternately repeat a state of $W_{fL}$ and a state of $W_{fH}$, which is higher than $W_{fL}$. From a time point $t_1$ to a time point $t_2$ (a time period $T_H$) when the feed speed $W_f$ is in the $W_{fH}$ state, the current I is set to $I_H$. From the time point $t_2$ to a time point $t_3$ (a time period $T_L$) when the feed speed $W_f$ is in the $W_{fL}$ state, the current I is set to $I_L$, which is smaller than $I_H$. The voltage V is maintained at a constant value $V_C$. The sum of the time period $T_L$ and the time period $T_H$ is a time period T per one cycle. The reciprocal 1/T of T is a frequency. The frequency 1/T can be set equal to or higher than 0.2 Hz and equal to or lower than 2 Hz, for example.

In a state where the feed speed $W_f$ is $W_{fH}$, obtained is a state (a buried arc state) where the welding wire 15 penetrates into a region surrounded by the molten region 12 as illustrated in FIG. 9A. On the other hand, in a state where $W_f$ is $W_{fL}$ which is lower than $W_{fH}$, obtained is a state (a state where a buried arc is cancelled) where the welding wire 15 is out of a region surrounded by the molten region 12 as illustrated in FIG. 9B.

Since the torch 19 moves relative to the first base material 50 and the second base material 60, a region where a molten region 12 is formed moves. A molten region 12, which has already been formed, is solidified with lowering of the temperature. A molten region 12 is sequentially formed along an extending direction of a region to be welded (a region where the first end face 51 and the second end face 61 face each other), and the formed molten region 12 is solidified, so that welding of the first base material 50 and the second base material 60 in this embodiment is completed.

In a welding method of this embodiment, an arc 11 is formed while a buried arc state and a state where a buried arc state is cancelled are alternately repeated in step (S30), so that the molten region 12 is formed to pierce through the first base material 50 and the second base material 60 in the thickness direction.

Referring to FIG. 9B, an arc 11 is formed in a state where a buried arc is cancelled, so that the width of the arc 11 (the width in a direction perpendicular to the first end face 51 and the second end face 61) becomes large, and the arc 11 is formed in a region close to the one main surface 52 of the first base material 50 and the one main surface 62 of the second base material 60. Accordingly, heat of the arc 11 is easily supplied to a region (a region close to the one main surface 52 of the first base material 50 and the one main surface 62 of the second base material 60) where occurrence of overlap is concerned. Accordingly, occurrence of overlap is suppressed. On the other hand, referring to FIG. 9A, an arc 11 is formed in a buried arc state, so that the width of the arc 11 becomes small, and the arc 11 is formed in a region close to the other main surface 53 of the first base material 50 and the other main surface 63 of the second base material 60. Accordingly, it becomes easy to achieve piercing welding. Since these states are alternately repeated, it is possible to achieve piercing welding while suppressing occurrence of overlap. Accordingly, it is possible with a welding method of this embodiment to improve the work efficiency of welding by achieving piercing welding in butt welding using GMA welding.

Referring to FIGS. 9A and 9B, it is preferable that the first base material 50 and the second base material 60 are welded together in a manner such that the thickness H of the first base material 50 and the second base material 60 with respect to the width W of the molten region 12 in a direction perpendicular to the first end face 51 and the second end face 61 becomes equal to or smaller than 1.3 in the above step (S30).

Embodiment 6

Next, a welding method of Embodiment 6, which is another embodiment of the present invention, will be described. A welding method of Embodiment 6 is carried out basically in a manner similar to the above case of Embodiment 5, and a similar effect is obtained. However, a welding method of Embodiment 6 is different from the case of Embodiment 5 in the shape of end faces of base materials.

Since the shape of end faces of base materials is similar to Embodiment 2, a welding method of Embodiment 6 will be described suitably referring to FIG. 4. Moreover, FIG. 11A is a schematic drawing illustrating a buried arc state in a welding step of Embodiment 6, and FIG. 11B is a schematic drawing illustrating a state where a buried arc is cancelled in a welding step of Embodiment 6.

Referring to FIG. 4, in a welding method of Embodiment 6, a first base material 50 and a second base material 60 having a beveling edge 70 formed thereon are prepared in step (S10). A beveling edge 70 is formed on the one main surfaces 52, 62 side of the first base material 50 and the second base material 60. The beveling edge 70 is formed in a manner such that a corner part of the first base material 50 where a first end face 51 and the one main surface 52 are connected with each other and a corner part of the second base material 60 where a second end face 61 and the one main surface 62 are connected with each other are removed. Accordingly, when the first base material 50 and the second base material 60 are disposed in a manner such that the first end face 51 and the second end face 61 face each other in step (S20), the interval between the first base material 50 and the second base material 60 in a region corresponding to the beveling edge 70 increases as the distance from the one main surfaces 52 and 62 decreases.

Figure 11A:
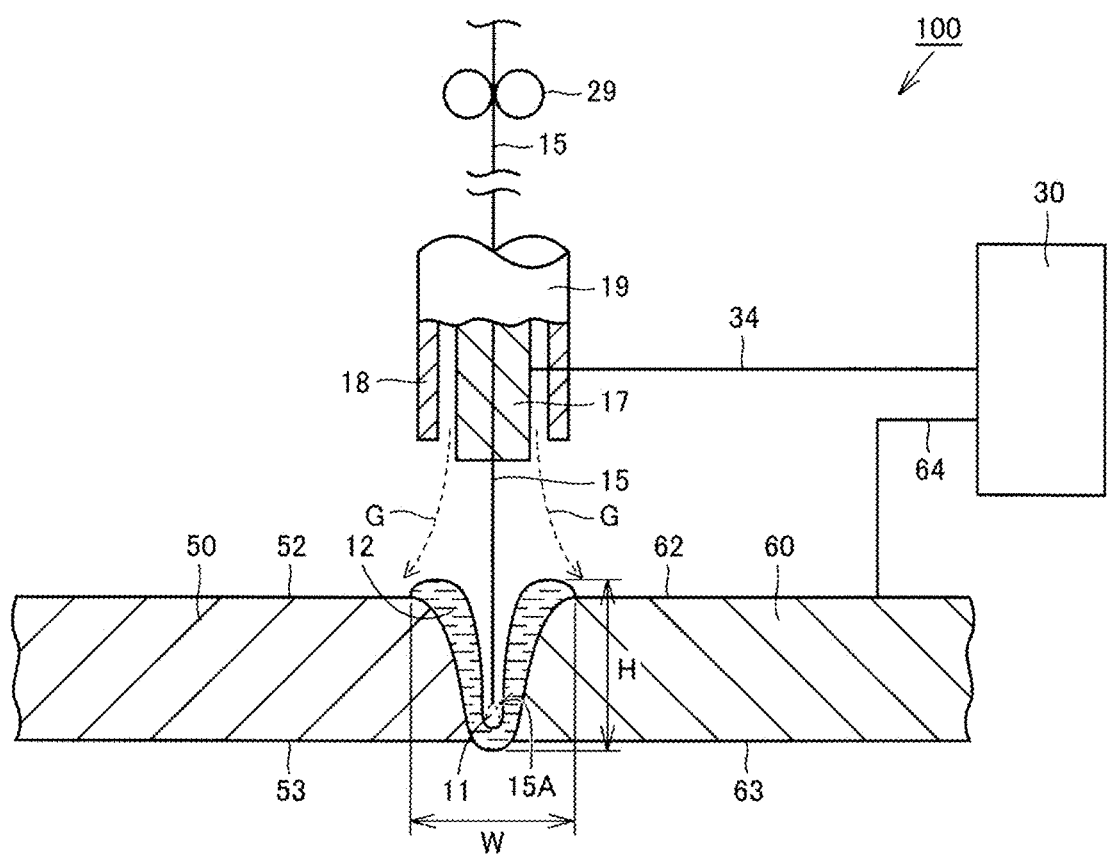
FIG. 11A A schematic drawing illustrating a buried arc state in a welding step of Embodiment 6.
Figure 11B:
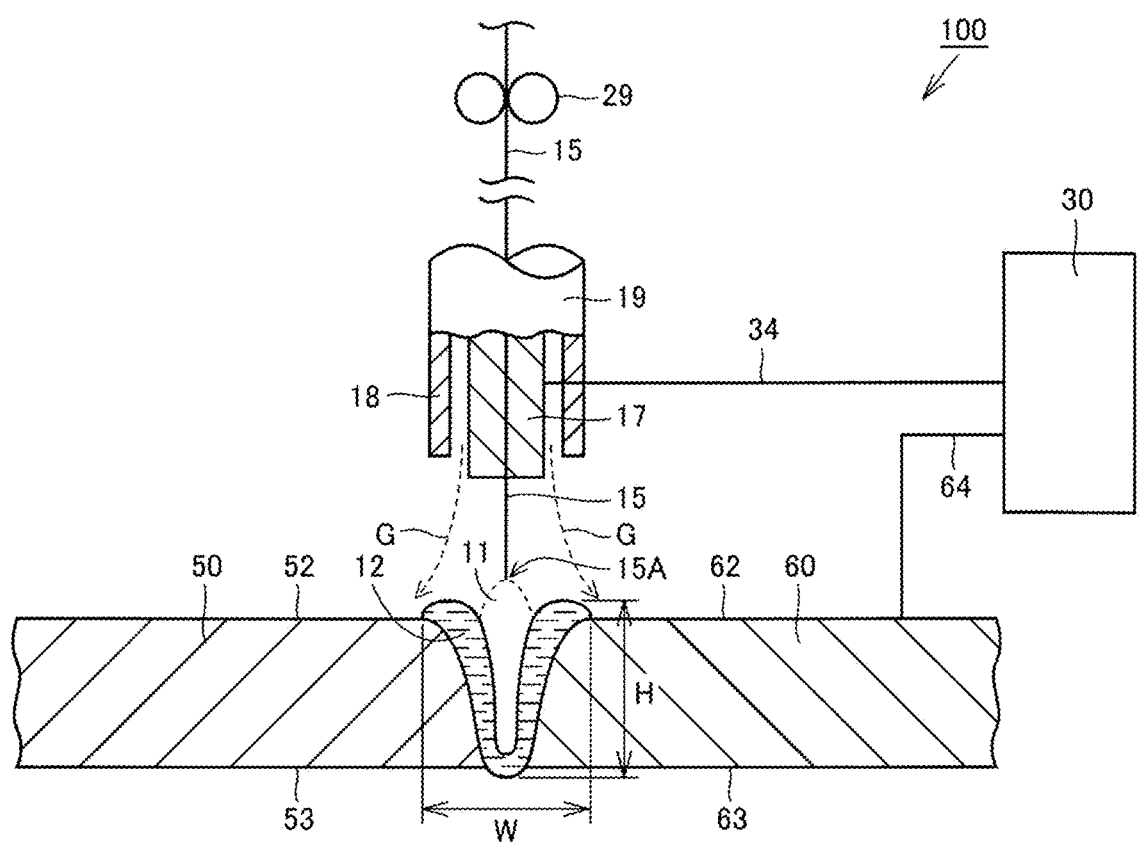
FIG. 11B A schematic drawing illustrating a state where a buried arc is cancelled in a welding step of Embodiment 6.

In step (S30), referring to FIGS. 11A and 11B, the first base material 50 and the second base material 60 are welded together in a state where the beveling edge 70 is formed. At this time, a region corresponding to the beveling edge 70 is filled by welding. That is, the amount of the welding wire 15 as filler material supplied to the molten region 12 becomes larger than the above case of Embodiment 1 wherein no beveling edge 70 is formed.

Since the beveling edge 70 is formed as described above, it becomes easy to achieve piercing welding in step (S30). Accordingly, a welding method of this embodiment is suitable in a case where a first base material 50 and a second base material 60 each having a large thickness are welded together.

Although the above embodiment has described a method of increasing and decreasing the feed speed of a welding wire so as to alternately repeat a buried arc state and a state where a buried arc is cancelled, it is to be noted that a welding method of the present invention is not limited to this. For example, a buried arc state and a state where a buried arc is cancelled may be alternately repeated by increasing and decreasing welding voltage.

Embodiment 7

Figure 12:
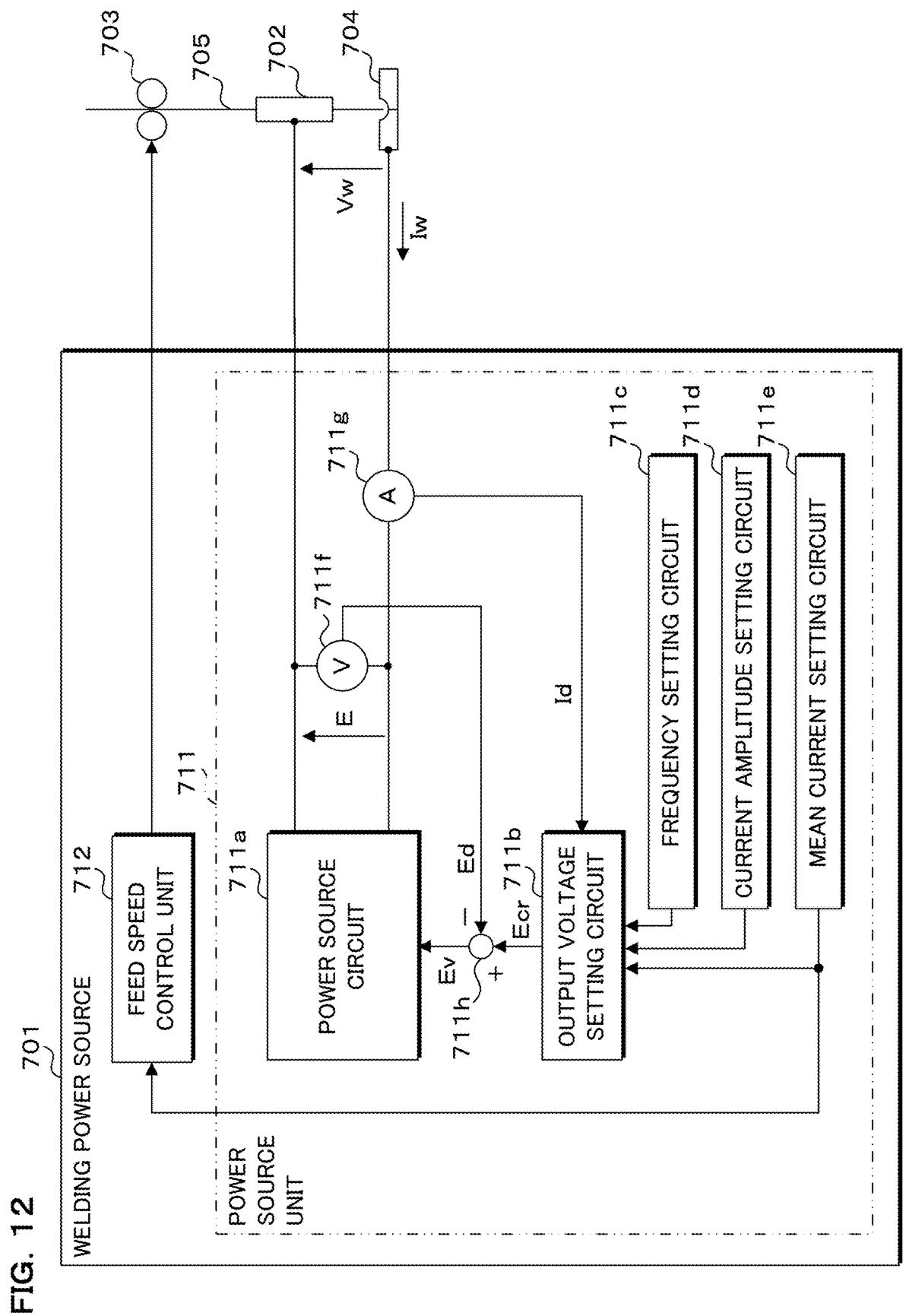
FIG. 12 A pattern diagram illustrating a structure of an arc welding device according to this Embodiment 7.

FIG. 12 is a pattern diagram illustrating one structure of an arc welding device according to this Embodiment 7. An arc welding device according to this Embodiment 7 is a gas shielded arc welding machine of consumable electrode type which can weld a base material 704 having a plate thickness of 9 to 30 mm by single pass butt welding, and is provided with a welding power source 701, a torch 702 and a wire feeding unit 703.

Figure 16:
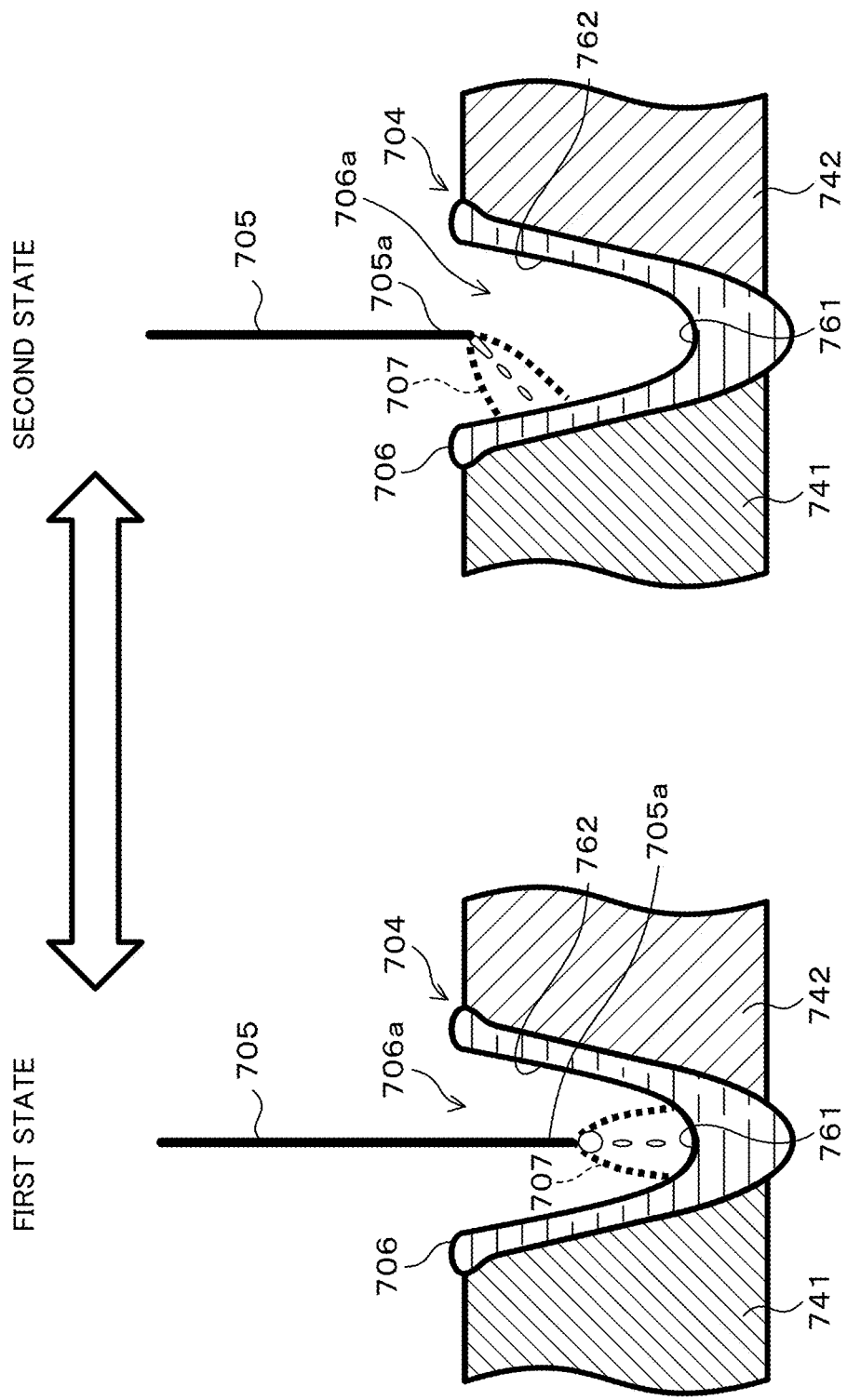
FIG. 16 A pattern diagram illustrating a welding method according to this Embodiment 7.

The torch 702 is made of electrically-conductive material such as copper alloy, and has a cylindrical contact tip, which guides a welding wire 705 to a welded part of the base material 704 and supplies welding current Iw required for generation of an arc 707 (see FIG. 16). The contact tip comes into contact with the welding wire 705 which is inserted into the contact tip, and supplies welding current Iw to the welding wire 705. Moreover, the torch 702 has a nozzle, which has a hollow cylindrical shape surrounding the contact tip and jets shielding gas to the welded part. The shielding gas is used for preventing oxidation of the welding wire 705 and the base material 704 molten by an arc 707. Shielding gas is inert gas or the like such as carbon dioxide gas, mixed gas of carbon dioxide gas and argon gas, or argon, for example.

The welding wire 705 is a solid wire, for example, has a diameter equal to or larger than 0.9 mm and equal to or smaller than 1.6 mm, and functions as a consumable electrode. The welding wire 705 is a pack wire held in a pail pack in a spirally wound state, or a reel wire wound around a wire reel, for example.

The wire feeding unit 703 has a feeding roller configured to feed the welding wire 705 to the torch 702, and a motor configured to rotate the feeding roller. The wire feeding unit 703 pulls out the welding wire 705 from the wire reel by rotating the feeding roller, and supplies the pulled-out welding wire 705 to the torch 702. It is to be noted that such a feeding technique of the welding wire 705 is one example, and is not especially limited.

The welding power source 701 is connected with the contact tip of the torch 702 and the base material 704 via a power supply cable, and is provided with a power source unit 711 configured to supply welding current Iw, and a feed speed control unit 712 configured to control the feed speed of the welding wire 705. It is to be noted that the power source unit 711 and the feed speed control unit 712 may be constructed as separate bodies. The power source unit 711 is a power source of a constant voltage characteristic, and is provided with: a power source circuit 711a configured to output PWM-controlled direct current; an output voltage setting circuit 711b; a frequency setting circuit 711c; a current amplitude setting circuit 711d; a mean current setting circuit 711e, a voltage detecting unit 711f; a current detecting unit 711g and a comparator circuit 711h.

The voltage detecting unit 711f detects a welding voltage Vw, and outputs a voltage value signal Ed, which indicates a detected voltage value, to the comparator circuit 711h.

The current detecting unit 711g detects a welding current Iw, which is supplied from the welding power source 701 via the torch 702 to the welding wire 705 and flows in the arc 707, for example, and outputs a current value signal Id, which indicates a detected current value, to the output voltage setting circuit 711b.

The frequency setting circuit 711c outputs a frequency setting signal, which is used for setting a frequency of periodical fluctuation of the welding current Iw and the welding voltage Vw between the base material 704 and the welding wire 705, to the output voltage setting circuit 711b. In a case where a welding method according to this Embodiment 7 is carried out, the frequency setting circuit 711c outputs a frequency setting signal, which indicates a frequency equal to or higher than 10 Hz and equal to or lower than 1,000 Hz, preferably a frequency equal to or higher than 50 Hz and equal to or lower than 300 Hz, or more preferably a frequency equal to or higher than 80 Hz and equal to or lower than 200 Hz.

The current amplitude setting circuit 711d outputs an amplitude setting signal, which is used for setting an amplitude of welding current Iw that periodically fluctuates, to the output voltage setting circuit 711b. In a case where a welding method according to this Embodiment 7 is carried out, the current amplitude setting circuit 711d outputs an amplitude setting signal, which indicates a current amplitude equal to or larger than 50 A, preferably a current amplitude equal to or larger than 100 A and equal to or smaller than 500 A, or more preferably a current amplitude equal to or larger than 200 A and equal to or smaller than 400 A.

The mean current setting circuit 711e outputs a mean current setting signal, which is used for setting the mean current of the welding current Iw that periodically fluctuates, to the output voltage setting circuit 711b and the feed speed control unit 712. In a case where a welding method according to this Embodiment 7 is carried out, the mean current setting circuit 711e outputs a mean current setting signal, which indicates a mean current equal to or larger than 300 A, preferably a mean current equal to or larger than 300 A and equal to or smaller than 1,000 A, or more preferably a mean current equal to or larger than 500 A and equal to or smaller than 800 A.

The output voltage setting circuit 711b generates an output voltage setting signal Ecr, which indicates a target voltage having an arbitrary waveform such as a rectangular waveform or a triangular waveform, for example, on the basis of the current value signal Id, the frequency setting signal, the amplitude setting signal and the mean current setting signal outputted from the respective units so that the welding current Iw has a target frequency, a target current amplitude and a target mean current, and outputs the generated output voltage setting signal Ecr to the comparator circuit 711h.

The comparator circuit 711h compares the voltage value signal Ed outputted from the voltage detecting unit 711f with the output voltage setting signal Ecr outputted from the output voltage setting circuit 711b, and outputs a differential signal Ev, which indicates the differential thereof, to the power source circuit 711a.

The power source circuit 711a is provided with an AC-DC converter configured to perform AC-DC conversion to commercial alternating current, an inverter circuit configured to convert direct current obtained by AC-DC conversion into required alternating current by switching, a rectifier circuit configured to rectify alternating current obtained by conversion, and the like. The power source circuit 711a controls the inverter by PWM control depending on the differential signal Ev outputted from the comparator circuit 711h, and outputs voltage to the welding wire 705. As a result, welding voltage Vw, which periodically fluctuates, is applied between the base material 704 and the welding wire 705, and welding current Iw is supplied. It is to be noted that the welding power source 701 is constructed in a manner such that an output instruction signal from outside is inputted into the welding power source 701 via an unillustrated control communication line, and the power source unit 711 causes the power source circuit 711a to supply welding current Iw by using the output instruction signal as a trigger. An output instruction signal is outputted from a welding robot to the welding power source 701, for example. In a case of a manual welding machine, an output instruction signal is outputted from the torch 702 side to the welding power source 701 when a hand control switch provided on the torch 702 side is operated.

The power source unit 711 of the welding power source 701 has a constant voltage characteristic. For example, the power source unit 711 has an external characteristic such that lowering of welding voltage with respect to increase of welding current of 100 A becomes equal to or larger than 4 V and equal to or smaller than 20 V. By setting the external characteristic of the power source unit 711 in such a manner, it becomes easy to maintain a buried arc state.

In a case where the above lowering of welding voltage is smaller than 4 V, fluctuation of welding voltage with respect to fluctuation of arc length due to disturbance factors is small, and the welding current fluctuates largely. As a result, the molten portion 706 swings largely, and it becomes difficult to maintain a buried arc state. By setting the above lowering of welding voltage equal to or larger than 4 V, swing of the molten portion 706 is suppressed, and it becomes easy to maintain a buried arc state.

In a case where the arc length becomes short due to disturbance factors, the value of welding current increases, the melting speed of the welding wire 705 increases, and the arc length increases. On the other hand, in a case where the arc length becomes large due to disturbance factors, the value of welding current decreases, the melting speed of the welding wire 705 lowers, and the arc length decreases (a self-adjusting effect of arc length). In a case where the above lowering of welding voltage exceeds 20 V, fluctuation of the welding current with respect to fluctuation of arc length due to disturbance factors is small, and therefore the above self-adjusting effect of arc length becomes small. As a result, it becomes difficult to maintain a buried arc state. By setting the above lowering of welding voltage equal to or smaller than 20 V, the above self-adjusting effect of arc length is maintained, and it becomes easy to maintain a buried arc state.

It is to be noted that it is preferable to set the above voltage lowering equal to or larger than 5 V. It is also preferable to set the above voltage lowering equal to or smaller than 15 V.

Figure 13:
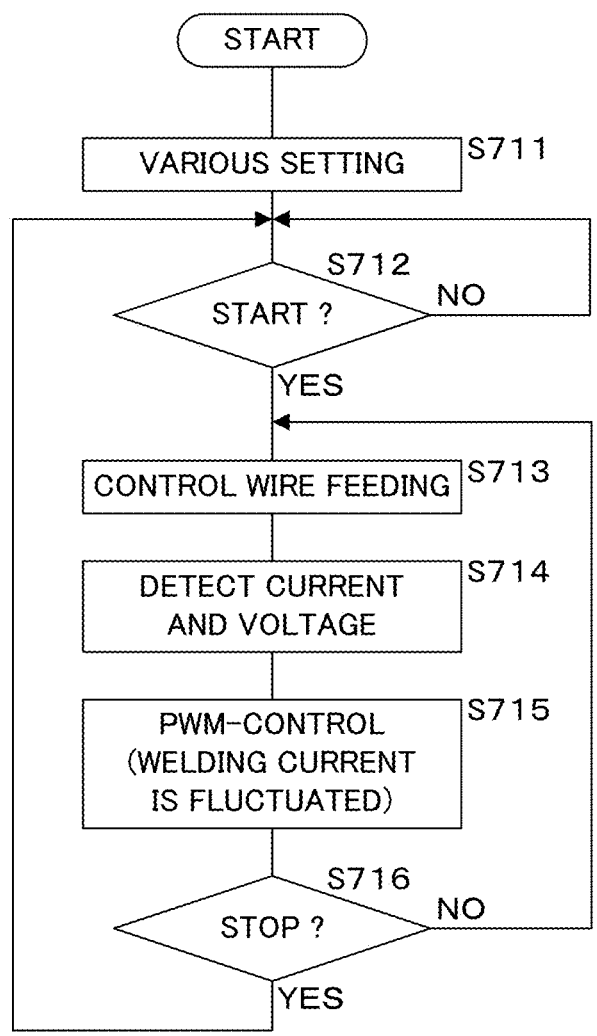
FIG. 13 A flowchart illustrating the procedures of a welding method according to this Embodiment 7.
Figure 14:
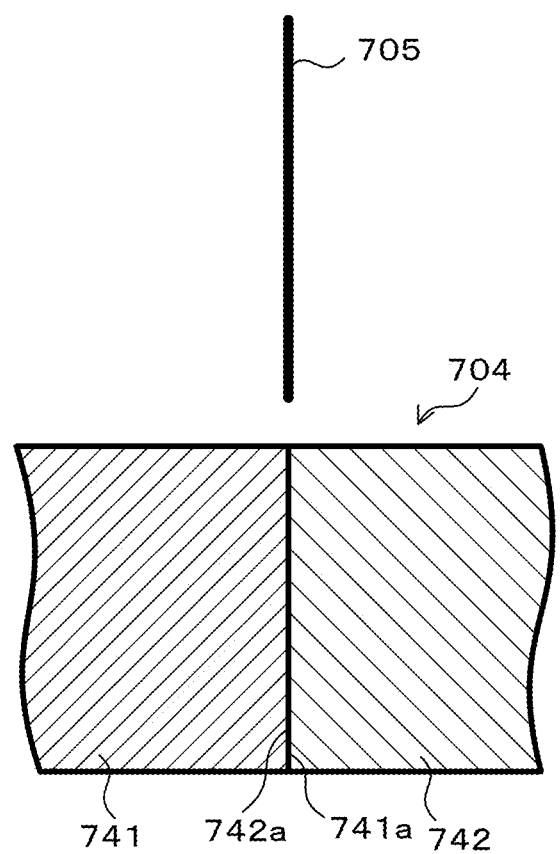
FIG. 14 A side sectional view illustrating base materials to be welded.

FIG. 13 is a flowchart illustrating procedures of a welding method according to this Embodiment 7, and FIG. 14 is a side sectional view illustrating base materials 704 to be welded. First, a pair of base materials 704 to be joined by welding are disposed in an arc welding device, and various settings of the welding power source 701 are made (step S711). Specifically, a platelike first base material 741 and a platelike second base material 742 are prepared as illustrated in FIG. 14, and are located at a predetermined welding work position with end faces 741a and 742a, which are a welded part, being butted. It is to be noted that a beveling edge having an arbitrary shape such as Y shape or L shape may be provided at the first base material 741 and the second base material 742 as required. The first and second base materials 741 and 742 are steel plates such as mild steel, carbon steel for machine structure use or alloy steel for machine structure use, for example, and each have a thickness equal to or larger than 9 mm and equal to or smaller than 30 mm.

In addition, the welding power source 701 sets a welding condition of welding current Iw within a range of a frequency equal to or higher than 10 Hz and equal to or lower than 1,000 Hz, a mean current equal to or larger than 300 A, and a current amplitude equal to or larger than 50 A.

It is to be noted that all condition settings of welding current Iw may be made by a welding worker, or the welding power source 701 may be constructed to accept execution of a welding method according to this Embodiment 7 at an operation unit and automatically make all condition settings. Moreover, a welding power source 701 may be constructed to accept a part of a welding condition such as a mean current at an operation unit, decide the rest of the welding condition suitable for the accepted part of welding condition, and semi-automatically make condition settings.

After various settings are made, the welding power source 701 determines whether an output start condition of welding current Iw is satisfied or not (step S712). Specifically, the welding power source 701 determines whether an output instruction signal of welding has been inputted or not. When it is determined that an output instruction signal has not been inputted and the output start condition of welding current Iw is not satisfied (step S712: NO), the welding power source 701 waits for input of an output instruction signal.

When it is determined that the output start condition of welding current Iw is satisfied (step S712: YES), the feed speed control unit 712 of the welding power source 701 outputs a feed instruction signal, which instructs feeding of a wire, to the wire feeding unit 703, and causes the wire feeding unit 703 to feed the welding wire 705 at a predetermined speed (step S713). The feed speed of the welding wire 705 is set within a range of approximately 5 to 100 m/min, for example. The feed speed control unit 712 decides a feed speed depending on a mean current setting signal outputted from the mean current setting circuit 711*e*. It is to be noted that the feed speed of the welding wire 705 may be a constant speed, or may be periodically fluctuated. Moreover, the device may be constructed in a manner such that a welding worker directly sets the feed speed of a wire.

The power source unit 711 of the welding power source 701 then detects a welding voltage Vw and a welding current Iw at the voltage detection unit 711*f* and the current detection unit 711*g* (step S714), generates a target voltage such that the frequency, the current amplitude and the mean current of the detected welding current Iw coincide with a set welding condition and the welding current Iw periodically fluctuates, and controls welding voltage by PWM control (step S715). That is, the welding power source 701 periodically fluctuates the target voltage and controls output in a manner such that the welding current Iw periodically fluctuates with a frequency equal to or higher than 10 Hz and lower than 1,000 Hz, a mean current equal to or larger than 300 A and a current amplitude equal to or larger than 50 A in a constant voltage characteristic.

The power source unit 711 of the welding power source 701 then determines whether output of the welding current Iw is to be stopped or not (step S716). Specifically, the welding power source 701 determines whether input of an output instruction signal still continues or not. When it is determined that input of an output instruction signal still continues and output of the welding current Iw is not to be stopped (step S716: NO), the power source unit 711 returns the process to step S713, and continues output of the welding current Iw.

When it is determined that output of the welding current Iw is to be stopped (step S716: YES), the power source unit 711 returns the process to the step S712.

Figure 15A:
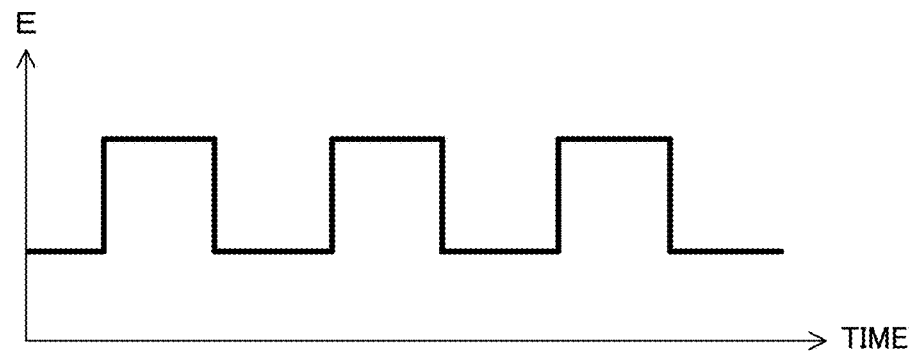
FIG. 15A A graph illustrating fluctuation of welding voltage and welding current.
Figure 15B:
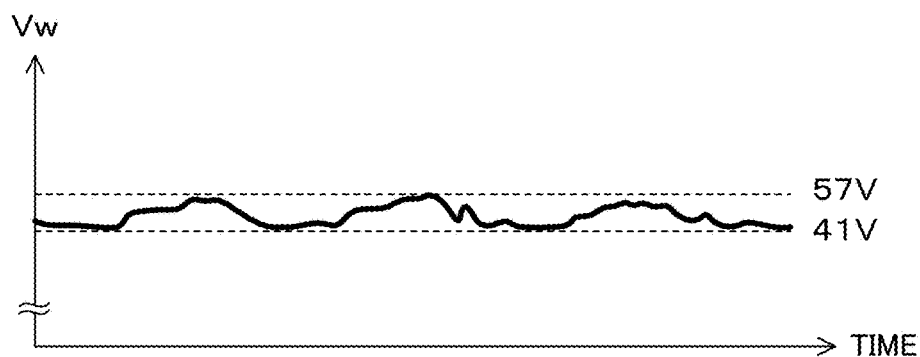
FIG. 15B A graph illustrating fluctuation of welding voltage and welding current.
Figure 15C:
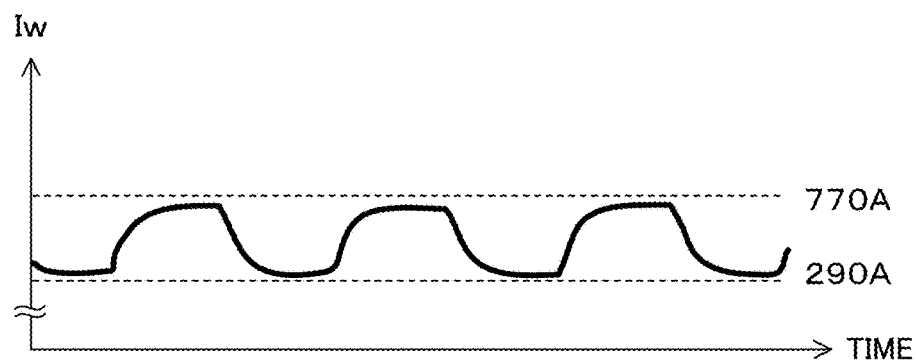
FIG. 15C A graph illustrating fluctuation of welding voltage and welding current.

FIGS. 15A to 15C are graphs illustrating fluctuation of welding voltage Vw and welding current Iw, and FIG. 16 is a pattern diagram illustrating a welding method according to this Embodiment 7. The horizontal axis in each of the graphs illustrated in FIGS. 15A to 15C corresponds to time, and the vertical axes in the graphs illustrated in FIGS. 15A to 15C respectively correspond to setting voltage of the welding power source 701, welding voltage Vw between the base material 704 and the welding wire 705, and welding current Iw which flows in the arc 707.

In a welding method according to this Embodiment 7, the power source unit 711 controls welding current Iw in a manner such that the frequency of the welding current Iw becomes equal to or higher than 10 Hz and equal to or lower than 1,000 Hz, the mean current becomes equal to or larger than 300 A, and the current amplitude becomes equal to or larger than 50 A. Specifically, the welding power source 701 of a constant voltage characteristic sets a target voltage such that the welding current Iw fluctuates as described above, and periodically fluctuates the target voltage. The same goes for the following control of welding current Iw. By periodically fluctuating the welding current Iw in a constant voltage characteristic, it is possible to stabilize the molten portion 706 of a buried arc more effectively.

The power source unit 711 preferably controls welding current Iw in a manner such that the frequency of the welding current Iw becomes equal to or higher than 50 Hz and equal to or lower than 300 Hz, the mean current becomes equal to or larger than 300 A and equal to or smaller than 1,000 A, and the current amplitude becomes equal to or larger than 100 A and equal to or smaller than 500 A The power source unit 711 more preferably controls welding current Iw in a manner such that the frequency of the welding power source 701 becomes equal to or higher than 80 Hz and equal to or lower than 200 Hz, the current amplitude becomes equal to or larger than 200 A and equal to or smaller than 400 A, and the mean current becomes equal to or larger than 500 A and equal to or smaller than 800 A as illustrated in FIG. 15C. It is to be noted that the frequency of the welding current is approximately 100 Hz, the current amplitude is approximately 240 A, and the mean current is approximately 530 A in FIG. 15C. In a case where the base material 704 having a board thickness of 12 mm is welded under such a welding condition of welding current Iw, the welding wire 705 is preferably fed at a speed of approximately 40 m/min, assuming that the diameter of the welding wire 705 is 1.2 mm, for example. The diameter of the welding wire 705 will be suitably hereinafter referred to as a wire diameter. In a case where the welding current Iw and the wire feed speed are set as described above, the setting voltage becomes a rectangular waveform voltage having a frequency of 100 Hz and a voltage amplitude of 30 V as illustrated in FIG. 15A, for example, a welding voltage Vw is applied between the welding wire 705 and the base material 704 as illustrated in FIG. 15B, and welding current Iw flows as illustrated in FIG. 15C. The welding power source 701 controls setting voltage with a frequency of 100 Hz in a manner such that the current amplitude of the welding current Iw becomes 240 A and the mean current becomes 530 A, for example. Moreover, the welding power source 701 controls feeding of the welding wire 705 at a speed of approximately 40 m/min. Although the welding voltage Vw fluctuates within the range equal to or larger than 41 V and equal to or smaller than 57 V, it is to be noted that the fluctuation range of the welding voltage Vw is changed by influence of various impedances. Moreover, the current waveform illustrated in FIG. 15C is one example, and is not especially limited. For example, the current waveform may be a substantially rectangular waveform, or may be a triangular waveform.

When the welding current Iw is periodically fluctuated under such a welding condition, a concave molten portion 706, which is made of molten metal of the welding wire 705 and the base material 704 molten by heat of the arc 707 that is generated between a tip part 705*a* of the welding wire 705 and the welded part, is formed at the base material 704. By photographing the condition of the arc 707 with a high-speed camera, it was confirmed that periodical fluctuation was achieved between a first state where the arc 707 is generated between the tip part 705a of the welding wire 705 and a bottom part 761 of the molten portion 706 and a second state where the arc 707 is generated between the tip part 705a and a side part 762 of the molten portion 706 as illustrated in the left figure of FIG. 16.

Specifically, a first state where the arc 707 jumps from the tip part 705a of the welding wire 705 to the bottom part 761 of the molten portion 706 and a second state where the arc 707 jumps from the tip part 705a of the welding wire 705 to the side part 762 of the molten portion 706 are alternately repeated. The first state is a state where the droplet transfer form of the welding wire 705 is drop transfer, for example. The second state is a state where the droplet transfer form of the welding wire 705 is rotating transfer, for example. Drop transfer is one example of a form of droplet transfer from the tip part 705a of the welding wire 705 to the bottom part 761 of the molten portion 706, and rotating transfer is one example of a form of droplet transfer from the tip part 705a of the welding wire 705 to the side part 762 of the molten portion 706. Although molten metal tends to flow in a direction such that a buried space 706a is closed and the tip part 705a of the welding wire 705 is buried, the arc 707 jumps to the side part 762 of the molten portion 706 in the second state and molten metal of the molten portion 706 is pushed back away from the welding wire 705, and therefore the buried space 706a is stabilized in a concave state. It is to be noted that the tip part 705a of the welding wire 705 becomes short as a result of transfer of a droplet of the tip part 705a of the welding wire 705 molten by large current in the right figure of FIG. 16.

By fluctuating such a first state and a second state with a frequency equal to or higher than 10 Hz, preferably a frequency equal to or higher than 50 Hz and equal to or lower than 300 Hz, or more preferably a frequency equal to or higher than 80 Hz and equal to or lower than 200 Hz, it is possible to finely vibrate molten metal at a higher frequency than a large waving cycle, and suppress waving of molten metal.

Figure 17:
FIG. 17 A chart illustrating experimental result regarding stabilization of a bead shape and a buried space using photographs.
Figure 17:
Figure 17:
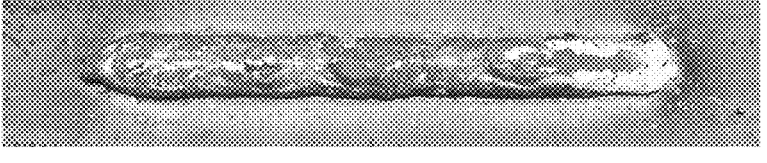

FIG. 17 is a chart illustrating experimental results regarding stabilization of the bead shape and the buried space 706a using photographs, and FIG. 18 is a chart illustrating experimental results regarding stabilization of the bead shape and the buried space 706a using pattern diagrams. The frequency and the amplitude of welding current were varied under a welding condition of a wire diameter of 1.4 mm, a projecting length of the welding wire 705 of 18 mm, a feed speed of the welding wire 705 of 17.5 m/min and a mean welding current of 530 A, and buried arc welding of a thick plate was performed.

The upper figures of FIGS. 17 and 18 illustrate an experimental result obtained when the frequency of welding current was 0 Hz and the amplitude was 0 A, that is, the appearance and the shape of a bead formed when welding was performed without vibrating the welding current. The central figures of FIGS. 17 and 18 illustrate the shape of a bead formed when welding was performed under a condition of a frequency of welding current of 10 Hz and an amplitude of 50 A, and the lower figures of FIGS. 17 and 18 illustrate the appearance and the shape of a bead formed when welding was performed under a condition of a frequency of welding current of 50 Hz and an amplitude of 100 A.

As can be seen from experimental results illustrated in FIGS. 17 and 18, it is understood that a bead shape more preferable than the case of a frequency of 0 Hz is obtained by vibrating the welding current under a welding condition of a frequency equal to or higher than 10 Hz and a current amplitude equal to or larger than 50 A. Such a preferable bead shape shows that the buried space 706a is stabilized by vibrating the welding current with a frequency of 10 Hz and occurrence of short circuit is suppressed.

Moreover, according to the operation principle of suppression of waving of molten metal, it is expected that it is possible to similarly suppress waving of molten metal and stabilize the buried space 706a even when the frequency of welding current is equal to or larger than 10 Hz, by vibrating the molten metal at a high frequency. Since waving of the molten metal can be sufficiently suppressed with a current amplitude of 50 A, it is also expected that it is possible to suppress waving of the molten metal even when the current amplitude is equal to or larger than 50 A. Actually, as illustrated in FIGS. 17 and 18, a more preferable bead shape was obtained when welding was performed under a welding condition of a frequency of welding current of 50 Hz and a welding current equal to or larger than 100 A. It is to be noted that the wire diameter, the projecting length of the welding wire 705, the feed speed and the mean current are not especially limited and may be any values within a range with which a buried arc that will be described later can be realized, and a preferable bead shape is similarly obtained under a condition of a frequency of welding current equal to or higher than 10 Hz and a current amplitude of 50 A. Especially, a more preferable bead shape is obtained when the frequency is 50 Hz and the current amplitude is equal to or larger than 100 A.

<Welding Condition of Buried Arc>

The following description will explain a welding condition which realizes a buried arc.

Generally in arc welding, the position of the tip part 705a of the welding wire 705 is positioned on an upper side than the base material 704, and an arc is generated between the tip part 705a of the welding wire 705 and the base material 704 in such a state. An arc generated in such a state will be referred to a non-buried arc. Regarding a non-buried arc, the distance between the tip part 705a of the welding wire 705 and the surface of molten metal formed on the surface of the base material 704 will be referred to as an arc length, and it is known that this arc length becomes short as welding voltage lowers. When welding voltage is decreased and an arc length becomes short in normal arc welding, the distance between the molten metal and the position of the tip part 705a of the welding wire 705 becomes small, and the arc length finally becomes zero, which causes short circuit between the welding wire 705 and the base material 704 and makes it difficult to maintain the arc.

However, in high current welding wherein molten metal is pushed aside by arc pressure, short circuit hardly happens even when the voltage is lowered. As a result, even when the tip part 705a of the welding wire 705 is positioned at a position deeper than the surface of molten metal or the base material 704, existence of a space formed when molten metal is pushed aside by arc pressure, that is, the buried space 706a prevents occurrence of short circuit, and it is possible to maintain an arc. This is a buried arc phenomenon.

In other words, it is possible to realize a buried arc by generating an arc under a low voltage condition in a high current region where strong arc pressure is applied. Specifically, the welding current needs to be equal to or lager than 300 A (e.g., Satoru Asai, "Improving Efficiency of Shop Welding—Cases of Heavy Electrical Machinery Welding—", Welding Technology Information Center of General Incorporated Association The Japan Welding Engineering Society, WE-COM Magazine 16th Issue, April 2015). Although a voltage value which can realize a buried arc is fluctuated by the welding current, the wire diameter and the projecting length of the welding wire 705, it is possible to realize a buried arc by employing a voltage sufficiently low so that the position of the tip part 705*a* of the welding wire 705 is lowered to a position lower than the surface of molten metal or the base material 704 as described above.

Figure 19:
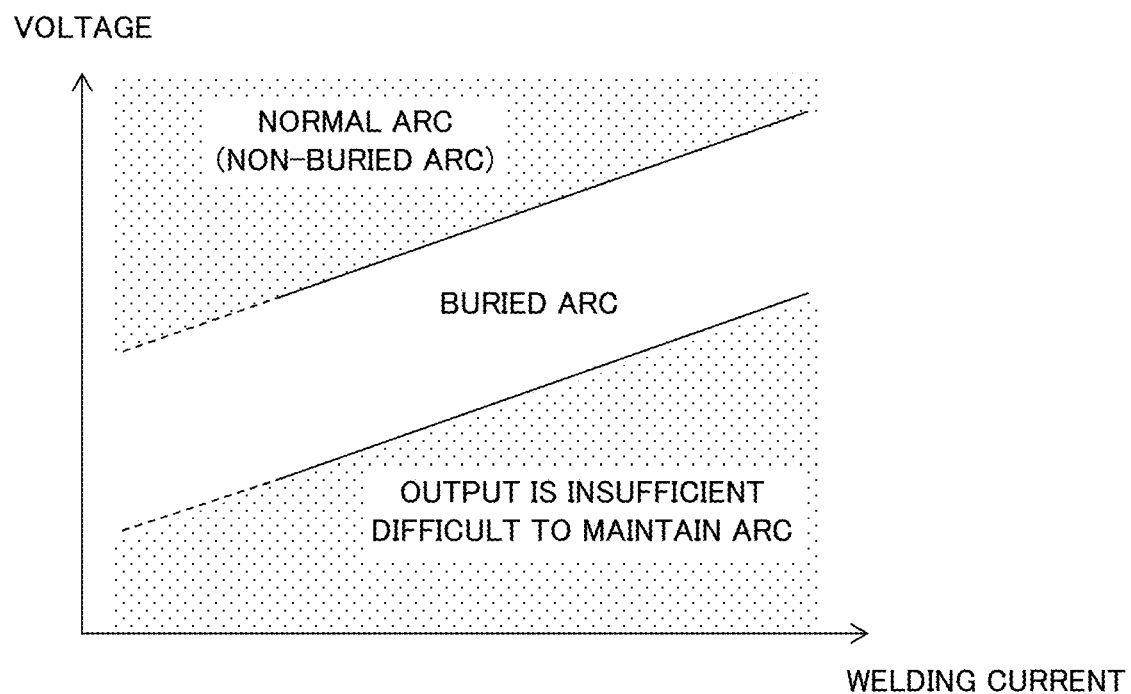
FIG. 19 A graph illustrating a condition of voltage and welding current, which realize a buried arc.

FIG. 19 is a graph illustrating a condition of welding current and voltage which realize a buried arc. The horizontal axis shows welding current, and the vertical line shows welding voltage. The white part indicates welding current and voltage which can realize a buried arc. As illustrated in FIG. 19, normal arc welding, i.e., non-buried arc welding is performed when welding voltage is too high with respect to welding current, or it becomes difficult to maintain an arc when welding voltage is too low on the contrary and therefore output is insufficient. The intermediate region therebetween includes a range of a buried arc where an arc 707 is generated in a buried space 706*a*.

Moreover, the range of a welding condition which realizes a buried arc is affected by the wire diameter and the projecting length of the welding wire 705 as described above.

Figure 20:
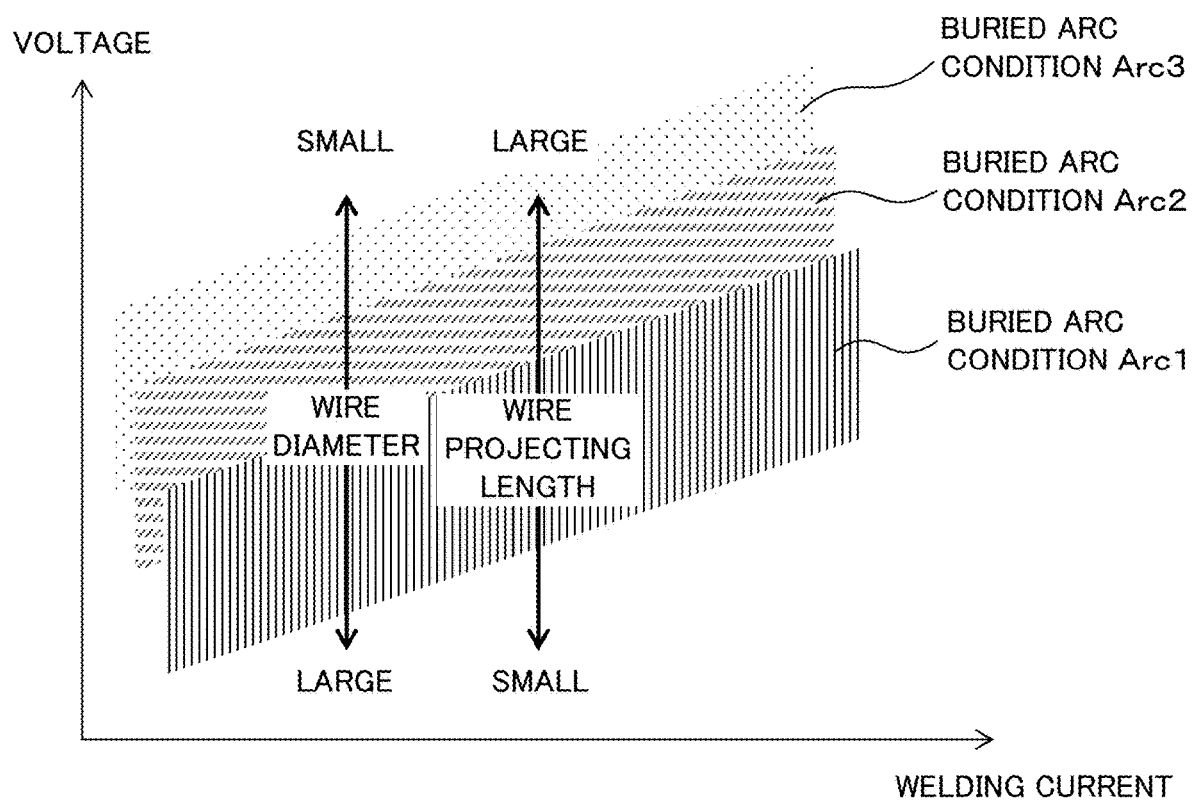
FIG. 20 A conceptual diagram illustrating the relation of a wire diameter and wire projecting length to a condition of voltage and welding current, which realize a buried arc.

FIG. 20 is a conceptual diagram illustrating the relation of the wire diameter and the wire projecting length to a condition of welding current and voltage which realize a buried arc. As illustrated in FIG. 20, the range of welding current and voltage which can realize a buried arc shifts to a lower voltage region side with respect to the same current as illustrated by the symbols Arc3, Arc2 and Arc1 in this order, as the wire diameter becomes larger or as the projecting length of the welding wire 705 becomes smaller.

Figure 21:
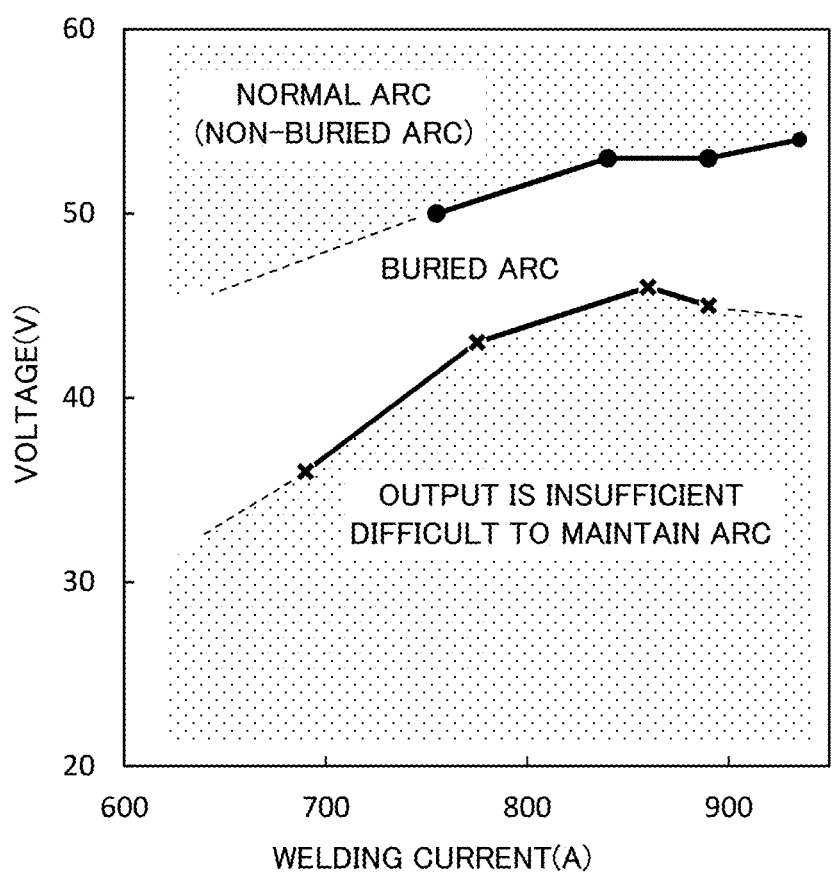
FIG. 21 A graph illustrating an example of a condition of voltage and welding current, which realize a buried arc in a case of a wire diameter of 1.6 mm and a projecting length of a welding wire of 25 mm.

FIG. 21 is a graph illustrating one example of a condition of welding current and voltage, which realize a buried arc, in a case of a wire diameter of 1.6 mm and a projecting length of the welding wire 705 of 25 mm. The horizontal axis of FIG. 21 shows welding current, and the vertical axis shows welding voltage. Black circular markers indicate the boundary between a non-buried arc and a buried arc. In FIG. 21, a black circular marker on the upper polygonal line becomes a non-buried arc when welding voltage is increased with a welding current indicated by the black circular marker, or becomes a buried arc when welding voltage is decreased. Moreover, a cross marker on the lower polygonal line becomes a buried arc when welding voltage is increased with a welding current indicated by the cross marker, or becomes a non-buried arc when welding voltage is decreased. In short, normal arc welding, i.e., non-buried arc welding is performed when welding voltage is high with respect to welding current, or it becomes difficult to maintain an arc when welding voltage is too low on the contrary and therefore output is insufficient. An intermediate region therebetween includes a range of a buried arc where an arc 707 is generated in a buried space 706*a*.

As described above, welding current which realizes a buried arc is equal to or larger than 300 A, and is a current value which can generate arc pressure that pushes molten metal aside, when the tip part 705*a* of the welding wire 705 comes close to the molten metal. Moreover, welding voltage which realizes a buried arc is a voltage value which can lower the position of the tip part 705*a* of the welding wire 705 to a position lower than the surface of molten metal or the base material 704.

A specific welding current and a specific voltage may be suitably decided by taking the tendency illustrated in FIGS. 19 and 20 into consideration on the basis of the range of welding current and voltage illustrated in FIG. 21.

<Welding Condition which can Suppress Waving of Molten Metal and Stabilization of Buried Space>

Another suitable welding condition which can stabilize the buried space 706*a* and suppress waving of molten metal will be described.

Such a suitable welding condition is, for example, a frequency of welding current equal to or higher than 20 Hz and equal to or lower than 600 Hz, an amplitude equal to or larger than 50 A and equal to or smaller than 500 A, and a mean current equal to or lager than 300 A and equal to or smaller than 1,000 A.

Moreover, the frequency of welding current may be equal to or higher than 40 Hz and equal to or lower than 380 Hz, the amplitude may be equal to or larger than 100 A and equal to or smaller than 500 A, and the mean current may be equal to or larger than 300 A and equal to or smaller than 1,000 A.

Furthermore, the frequency of welding current may be equal to or higher than 60 Hz and equal to or lower than 280 Hz, the amplitude may be equal to or larger than 100 A and equal to or smaller than 500 A, and the mean current may be equal to or larger than 300 A and equal to or smaller than 900 A.

Yet further, the frequency of welding current may be equal to or higher than 60 Hz and equal to or lower than 180 Hz, the amplitude may be equal to or larger than 150 A and equal to or smaller than 500 A, and the mean current may be equal to or larger than 300 A and equal to or smaller than 800 A.

As described above, it is possible with a welding method and an arc welding device according to this Embodiment 7 to suppress waving of molten metal by periodically fluctuating the welding current Iw and prevent occurrence of disordering and hanging of a bead, even in a case of gas shielded arc welding using large current equal to or larger than 300 A.

Moreover, it is required to keep a constant arc length in order to effectively suppress waving of molten metal. Since a self-adjusting effect of arc length cannot be obtained in a case of general constant current pulse welding, it is required to perform some control in order to assure a constant arc length. Since an arc welding device according to this Embodiment 7 has a constant voltage characteristic and a self-adjusting effect of arc length is obtained, a constant arc length is kept, and it is possible to suppress waving of molten metal more effectively.

Although this Embodiment 7 has described a case where a period when the welding current Iw and the welding voltage Vw are large and a period when the welding current Iw and the welding voltage Vw are small are substantially equal, it is to be noted that the ratio of the periods may be varied. By varying the ratio of the periods, it is possible to adjust the width of fluctuation of the vertical position of the tip part 705*a* of the welding wire 705 while suppressing waving of molten metal. For example, by enlarging the ratio of a period when the welding current Iw and the welding voltage Vw are large, the ratio that the tip part 705*a* of the welding wire 705 is maintained at a position higher than the bottom part 761 of the molten portion 706 becomes high. As a result, it becomes possible to increase heat input to the base material 704 and improve the bead forming quality.

Embodiment 8

Since a welding method and an arc welding device according to Embodiment 8 are different from Embodiment 7 in a welding condition such as welding current Iw, the following description mainly explains such a difference. Since the other structures and effects are similar to Embodiment 7, similar symbols are attached to corresponding components, and detailed description thereof will be omitted.

First, a droplet transfer form in buried arc welding and features thereof will be described.

Figure 22:
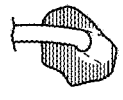
FIG. 22 A chart illustrating the respective droplet transfer forms of drop transfer, pendulum transfer and rotating transfer.
Figure 22:
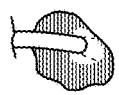
Figure 22:
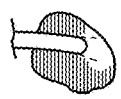
Figure 22:
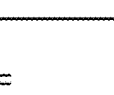
Figure 22:
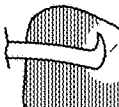
Figure 22:
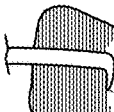
Figure 22:
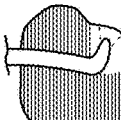
Figure 22:
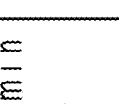
Figure 22:
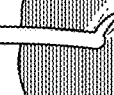

FIG. 22 is a chart illustrating the respective droplet transfer forms of drop transfer, pendulum transfer and rotating transfer. In FIG. 22, the left row illustrates welding conditions, and the right row illustrates a plurality of different droplet transfer forms. The central rows illustrate pattern diagrams each illustrating an image which is obtained by photographing a molten portion 706 that is in each droplet transfer form at every 0.4 milliseconds using a high-speed camera. In buried arc welding, a plurality of droplet transfer forms exist. The plurality of droplet transfer forms include three types of droplet transfer forms illustrated in FIG. 22, for example, that is, drop transfer, pendulum transfer and rotating transfer. Although drop transfer and rotating transfer are common names, it is to be noted that pendulum transfer is a word made by the present inventors.

Although these droplet transfer forms are affected by various factors including the welding current, the wire projecting length, the diameter of the welding wire 705, the material of the welding wire 705, the feed speed of the welding wire 705 and the like and are comprehensively decided, the droplet transfer forms are especially strongly affected by the welding current. It is to be noted that the wire projecting length is the distance between the tip of the contact tip and the base material 704. Drop transfer is performed in a case where welding current is relatively small, and the droplet transfer form transits to pendulum transfer or rotating transfer with rise of welding current.

Drop transfer is a droplet transfer form in which the tip part 705a of the welding wire 705 is molten and a droplet comes out of the welding wire 705 granularly, and an arc 707 is generated between the tip part 705a of the welding wire 705 and the bottom part 761 of the molten portion 706. In other words, the arc 707 is oriented downward or, in other words, in the extending direction of the welding wire 705 in drop transfer.

Pendulum transfer is a characteristic droplet transfer form in which a liquid column formed at the tip part 705a of the welding wire 705 and the arc 707 swing like a pendulum on the same plane while said plane slowly rotates as a whole with respect to a central axis of the extending direction of the welding wire 705.

Rotating transfer is a droplet transfer form in which an arc 707 is generated between the tip part 705a of the welding wire 705 and the side part 762 of the molten portion 706, and a liquid column formed at the tip part 705a of the welding wire 705 and the arc 707 keep rotating while being oriented toward the side part 762 of a concave molten portion 706.

Figure 23:
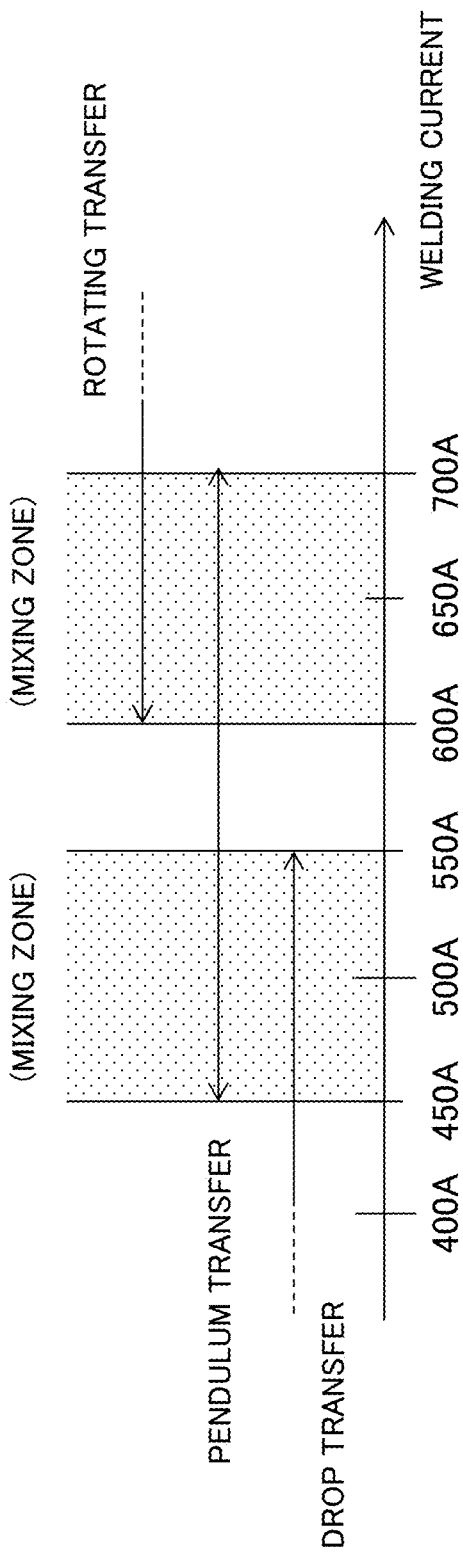
FIG. 23 A conceptual diagram illustrating the relation between a welding current of a case where the wire diameter is 1.2 mm and the wire projecting length is 25 mm and a droplet transfer form of a welding wire.

Relations between welding current and droplet transfer form under a condition of a wire projecting length of 25 mm, a diameter of the welding wire 705 of 1.2 mm, a material of the welding wire 705 of YGW12, and a feed speed of the welding wire 705 of 30 m/min as an example are collected in FIG. 23.

FIG. 23 is a conceptual diagram illustrating the relation between welding current and droplet transfer form of the welding wire 705 of a case where the wire diameter is 1.2 mm and the wire projecting length is 25 mm. The bold arrow indicates welding current, and the thin arrows indicate ranges of welding current with which the respective droplet transfer forms are performed. It is to be noted that the relation between welding current and droplet transfer form illustrated in FIG. 23 is obtained under the above condition such as the wire diameter and the wire projecting length, and is merely one example.

In a case where the welding current is in a current range equal to or larger than 300 A and smaller than 450 A, a droplet transfer form of drop transfer becomes dominant.

In a case where the welding current is in a current range equal to or larger than 450 A and smaller than 550 A, obtained is a state where droplet transfer forms of drop transfer and pendulum transfer are mixed.

In a case where the welding current is in a current range equal to or larger than 550 A and smaller than 600, a droplet transfer form of pendulum transfer becomes dominant.

In a case where the welding current is in a current range equal to or larger than 600 A and smaller than 700 A, obtained is a state where droplet transfer forms of pendulum transfer and rotating transfer are mixed.

In a case were the welding current is in a current range equal to or larger than 700 A, a droplet transfer form of rotating transfer becomes dominant.

In buried arc welding, although a buried space 706a, i.e., a space surrounded by a concave molten portion 706 is formed, molten metal always tends to flow in a direction such that the buried space 706a is closed and the tip part 705a of the welding wire 705 is buried. However, the molten portion 706 is supported by force of an arc with which the side part 762 of the molten portion 706 is irradiated from the tip part 705a of the welding wire 705, and the buried space 706a is retained in a stable state. When the arc 707 cannot support the buried space 706a, the opening of the buried space 706a becomes narrower, and finally comes into contact with the welding wire 705, causing short circuit. When short circuit occurs, the welding state becomes remarkably unstable. For example, in a situation where drop transfer is dominant, the arc 707 cannot sufficiently support the side part 762 of the molten portion 706, and the above short circuit may possibly make welding unstable.

On the contrary, in rotating transfer, the side part 762 of a concave molten portion 706 is irradiated with the arc 707 and the opening of the buried space 706a is supported, so that the buried space 706a can be stabilized.

Moreover, in pendulum transfer, the side part 762 of the molten portion 706 is also irradiated with an arc 707 at a constant interval, and therefore a similar effect of stabilizing the buried space 706a is obtained as with rotating transfer. In drop transfer, the arc 707 is oriented downward, that is, the bottom part 761 of the molten portion 706 is irradiated with the arc 707, and therefore the above stabilization effect cannot be obtained.

On the other hand, in rotating transfer, the bottom part 761 of the buried space 706a is not irradiated with the arc 707 though the buried space 706a can be stabilized, and therefore weld penetration of the base material 704 with respect to output of welding current tends to be relatively shallow. On the contrary, in drop transfer, the bottom part 761 of the molten portion 706 is irradiated with the arc 707, and therefore weld penetration per unit output of welding current becomes relatively deep. In pendulum transfer, the bottom part 761 of the molten portion 706 is also irradiated with the arc 707 at a constant interval, and therefore relatively deep weld penetration is obtained as with drop transfer.

Considering these, although drop transfer and rotating transfer offer regular droplet transfer, it is understood that stabilization of the buried space 706a and deep weld penetration cannot be consistent with each other. Moreover, although it is thought that stabilization of the buried space 706a and deep weld penetration can consist in pendulum transfer, a liquid column and an arc 707 behave irregularly, and therefore stable welding cannot be always realized.

That is, only a single droplet transfer form cannot realize compatibility of stabilization of a buried space 706a and deep weld penetration. Moreover, since the droplet transfer form varies depending on a current range of welding current as described above, it is difficult to generally use only a specific droplet transfer form.

Next, a welding method according to Embodiment 8 based on the above circumstances will be described. In Embodiment 8 of the present invention, compatibility of stabilization of a buried space 706a and deep weld penetration is realized by complexly using these three droplet transfer forms.

For example, in the process of periodically fluctuating the magnitude of welding current, it becomes possible to periodically repeating drop transfer and pendulum transfer or rotating transfer by setting the welding current Iw in a small current period within a current range which offers drop transfer and setting the welding current Iw in a large current period within a current range which offers pendulum transfer or rotating transfer. When the droplet transfer form becomes pendulum transfer or rotating transfer in a large current period, the side part 762 of a concave molten portion 706 is irradiated with an arc 707, and it becomes possible to stabilize a buried space 706a. On the other hand, when the droplet transfer form becomes drop transfer in a small current period, the bottom part 761 of a concave molten portion 706 is irradiated with an arc 707, and deep weld penetration is obtained. By periodically repeating these, it becomes possible to make deep weld penetration and stabilization of the buried space 706a compatible with each other.

Although the above description has explained the welding current Iw in a small current period as a current range of drop transfer and the welding current Iw in a large current period as a current range of pendulum transfer or rotating transfer, it is to be noted that the current ranges of welding current Iw in a small current period and a large current period are not limited to these.

Specifically, it is appropriate to periodically fluctuate the welding current between at least any two current ranges of a current range equal to or larger than 300 A and smaller than 450 A, a current range equal to or lager than 450 A and smaller than 550 A, a current range equal to or lager than 550 A and smaller than 600 A, a current range equal to or lager than 600 A and smaller than 700 A, and a current range equal to or lager than 700 A, so that the bottom part 761 and the side part 762 of the molten portion 706 are irradiated with the arc 707. The fluctuation cycle of welding current may be set within a range equal to or larger than 10 Hz and equal to or smaller than 1,000 Hz, or preferably within a range equal to or larger than 50 Hz and equal to or smaller than 300 Hz. The diameter of the welding wire 705 may be set equal to or larger than 0.9 mm and equal to or smaller than 1.6 mm, and the feed speed of the welding wire 705 may be set equal to or higher than 30 m/min. The feed speed of the welding wire 705 may be a constant feed speed such as 30 m/min, 50 m/min or 60 m/min, or may be fluctuated depending on the magnitude of welding current.

For example, it is appropriate that an arc welding device periodically fluctuates the welding current in a manner such that welding current Iw in a small current period becomes a current range equal to or larger than 300 A and smaller than 450 A and welding current Iw in a large current period becomes a current range equal to or lager than 550 A and smaller than 600 A. In such a case, droplet transfer forms of drop transfer and pendulum transfer are switched over periodically, and a first state where an arc 707 is generated between the tip part 705a of the welding wire 705 and the bottom part 761 of the molten portion 706 and a second state where an arc 707 is generated between the tip part 705a and the side part 762 of the molten portion 706 are periodically repeated.

Moreover, it is appropriate that an arc welding device periodically fluctuates the welding current in a manner such that welding current Iw in a small current period becomes a current range equal to or lager than 300 A and smaller than 450 A and welding current Iw in a large current period becomes a current range equal to or larger than 700 A. In such a case, droplet transfer forms of drop transfer and rotating transfer are switched over periodically, and a first state where an arc 707 is generated between the tip part 705a of the welding wire 705 and the bottom part 761 of the molten portion 706 and a second state where an arc 707 is generated between the tip part 705a and the side part 762 of the molten portion 706 are periodically repeated.

Furthermore, it is appropriate that an arc welding device periodically fluctuates the welding current in a manner such that welding current Iw in a small current period becomes a current range equal to or larger than 550 A and smaller than 600 A and welding current Iw in a large current period becomes a current range equal to or larger than 700 A. In such a case, droplet transfer forms of pendulum transfer and rotating transfer are switched over periodically, and a first state where an arc 707 is generated between the tip part 705a of the welding wire 705 and the bottom part 761 of the molten portion 706 and a second state where an arc 707 is generated between the tip part 705a and the side part 762 of the molten portion 706 are periodically repeated.

Yet further, the welding current may be periodically fluctuated using a current range where two droplet transfer forms are mixed.

For example, an arc welding device may periodically fluctuate the welding current in a manner such that welding current Iw in a small current period becomes a current range equal to or larger than 450 A and smaller than 550 A and welding current Iw in a large current period becomes a current range equal to or larger than 700 A. In such a case, a state where drop transfer and pendulum transfer are mixed, and rotating transfer are switched over periodically.

Moreover, an arc welding device may periodically fluctuate the welding current in a manner such that welding current Iw in a small current period becomes a current range equal to or lager than 300 A and smaller than 450 A and welding current Iw in a large current period becomes a current range equal to or larger than 600 A and smaller than 700 A. In such a case, drop transfer, and a state where pendulum transfer and rotating transfer are mixed are switched over periodically.

It is to be noted that the welding condition described above is one example, and the material of the welding wire 705, the wire diameter, the projecting length, the feed speed of the welding wire 705, and the range of welding current are not limited to the above numerical ranges. The following description will explain various conditions which enable mutual transition of droplet transfer forms of drop transfer, pendulum transfer and rotating transfer in a buried arc.

The material of the welding wire 705 may be solid wire such as YGW11, YGW15, YGW17, YGW18 or YGW19, instead of YGW12. Here, flux cored wire or metal cored wire, or other new wire may be employed as the welding wire 705.

The projecting length of the welding wire 705 is preferably equal to or larger than 10 mm and equal to or smaller than 35 mm. Since weld penetration becomes shallower as the projecting length becomes larger, it is appropriate to keep the projecting length no larger than 35 mm. On the other hand, when the projecting length becomes small, the tip part of the tip comes closer to molten pool and wear of the tip becomes severe. This tendency is especially remarkable because of large current welding, and frequent tip replacement becomes necessary when the projecting length is smaller than 10 mm.

Figure 24:
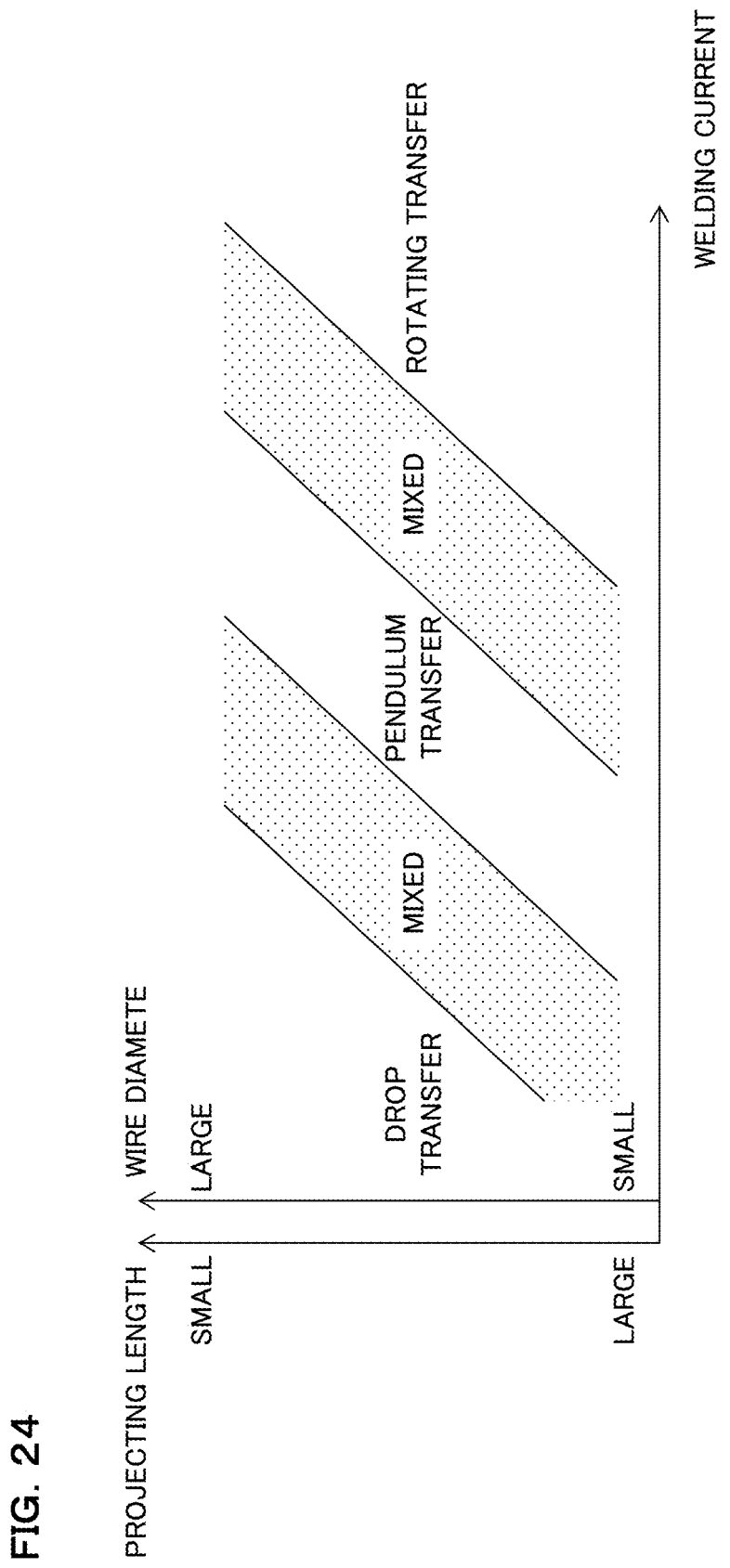
FIG. 24 A conceptual diagram illustrating the relation of a wire diameter and wire projecting length to a droplet transfer form of a welding wire.

Furthermore, the projecting length of the welding wire 705 affects transition current of transfer forms (see FIG. 24). From the perspective of the balance thereof, it is also said that the projecting length has a proper range and projecting length of approximately 10 to 35 mm is proper.

The wire diameter is preferably equal to or larger than 0.9 mm and equal to or smaller than 1.6 mm, for example. Although the wire diameter basically can be made to correspond to any wire diameter by appropriately changing the welding condition and is not especially limited, wire diameter of approximately 0.9 mm to 1.6 mm is practical from the perspective of general distributability. Moreover, the wire diameter affects transition current of droplet transfer forms (see FIG. 24). From this perspective, it is also said that a transition region of droplet transfer forms expands and it becomes difficult to use an arbitral droplet transfer form when using an extremely thick welding wire 705 or a thin welding wire 705. Consequently, wire diameter of approximately 0.9 to 1.6 mm is proper.

Since the feed speed of the welding wire 705 correlates with welding current, the feed speed may be suitably decided depending on welding current in a manner such that a buried space 706a is formed.

FIG. 24 is a conceptual diagram illustrating the relation of the wire diameter and wire projecting length to the droplet transfer form of the welding wire 705. The horizontal axis shows welding current, and the vertical axis shows the magnitude of the projecting length of the welding wire 705 and the magnitude of the wire diameter. Transition current of droplet transfer forms are strongly affected by the wire diameter and the projecting length. FIG. 24 shows influence of the projecting length of the welding wire 705 and the wire diameter on transition current of droplet transfer forms. As illustrated in FIG. 24, transition current wholly shifts to a higher current range side as the wire diameter becomes larger, or as the projecting length becomes smaller. This is caused by a difference of resistance heat generation of the welding wire 705, and resistance of the wire decreases and the heat input into the welding wire 705 due to resistance heat generation decreases as the wire diameter becomes larger or the projecting length becomes smaller. Accordingly, it is required to increase heat input by increasing welding current in order to reproduce the same droplet transfer phenomenon, and therefore transition current wholly shifts to a high current side.

Change in transition current when the wire diameter is changed will be specifically illustrated as one example.

Figure 25:
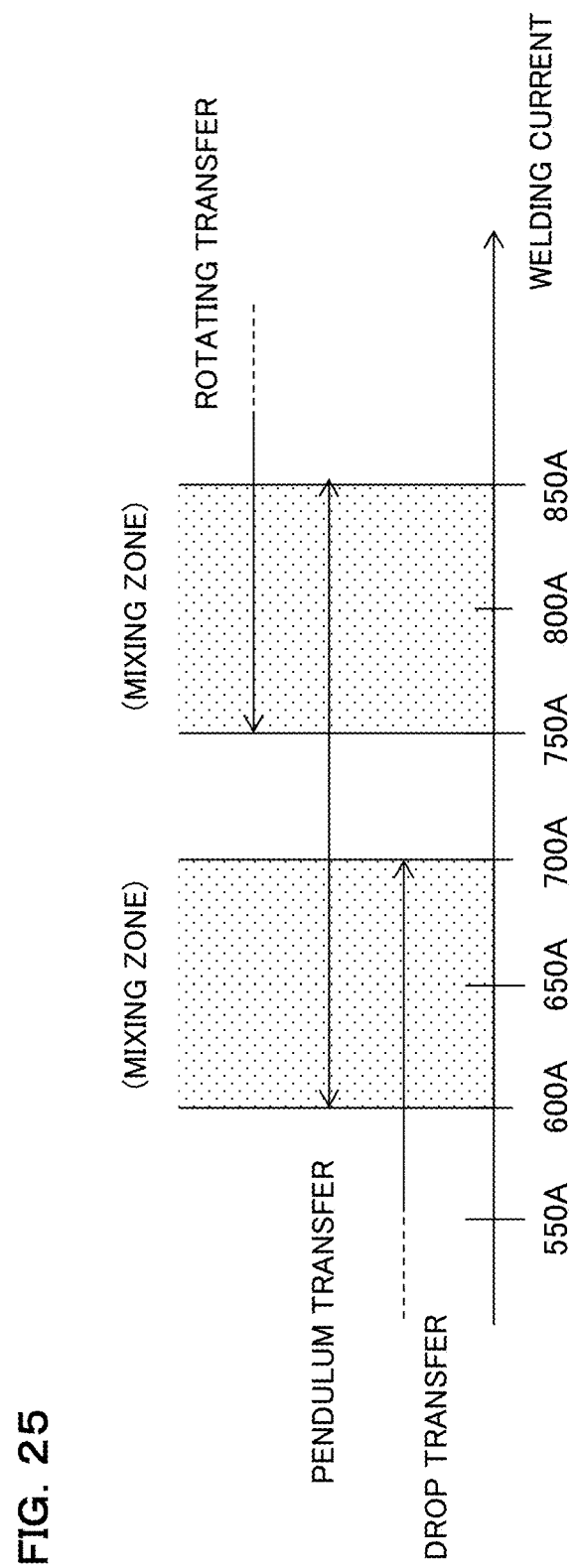
FIG. 25 A conceptual diagram illustrating the relation between a welding current of a case where the wire diameter is 1.4 mm and the wire projecting length is 25 mm and a droplet transfer form of a welding wire.

FIG. 25 is a conceptual diagram illustrating the relation between welding current for a wire diameter of 1.4 mm and a wire projecting length of 25 mm and droplet transfer form of the welding wire 705. FIG. 25 illustrates the relation between welding current and droplet transfer form under a condition of a wire projecting length of 25 mm, a diameter of the welding wire 705 of 1.4 mm, a material of the welding wire 705 of YGW12 and a feed speed of the welding wire 705 of 30 m/min as with FIG. 23, and the welding condition is different only in the wire diameter. When comparing a case where the wire diameter is 1.2 mm and a case where the wire diameter is 1.4 mm, transition current of a droplet transfer form wholly transits to a high current side as illustrated in FIGS. 23 and 25.

As described above, the wire diameter of the welding wire 705 and the projecting length can be suitably decided based on FIG. 23 or 25 from the perspective of the tendency illustrated in FIG. 24.

A welding power source 701 configured to carry out the above welding method sets a welding current, a frequency of welding current, and a feed speed of the welding wire 705 explained in the above welding method. It is to be noted that the welding power source 701 may accept such a welding condition at an operation unit and store the welding condition, or may preliminarily store a welding condition. The welding power source 701 controls feeding of the welding wire 705 on the basis of a set welding condition, and periodically fluctuates the welding current.

As described above, it is possible with a welding method and an arc welding device according to this Embodiment 8 to achieve periodical fluctuation between drop transfer, pendulum transfer and rotating transfer, and two states where these are mixed when the welding current is fluctuated under the above condition, to suppress waving of molten metal, and to realize stabilization of a buried space 706a and deep weld penetration.

It is to be noted that the side part 762 of the molten portion 706 is irradiated with an arc 707 not only in a large current period. Since the droplet transfer form transiently transits when the current period is switched over at a high frequency, the droplet transfer form does not always transit to pendulum transfer or rotating transfer even in a current range in which the droplet transfer form becomes pendulum transfer or rotating transfer in a normal steady state, that is, during a large current period, for example, and pendulum transfer or rotating transfer is sometimes offered slightly late after getting into a small current period.

Similarly, even in a large current period, drop transfer is sometimes offered, or the bottom part 761 of the molten portion 706 is sometimes irradiated with an arc 707.

Moreover, a small current period is not always a current range where drop transfer is offered steadily, and a large current period is not always a current range where pendulum transfer or rotating transfer is offered steadily. Since transition of the droplet transfer form is transient, a different droplet transfer form is sometimes offered temporarily or transiently even in a current range other than a current range where a corresponding droplet transfer form is offered steadily.

Furthermore, a large current period and a small current period are not necessarily in a state where the welding current is retained at a constant current value, and the current waveform of welding current, which fluctuates periodically, is not limited to a specific waveform such as rectangular wave. For example, the current waveform of welding current may be triangular wave. A large current period is a period when the welding current is averagely large, and a small current period is a period when the welding current is averagely small.

Yet further, although Embodiment 8 has explained an example wherein the droplet transfer form is fluctuated by periodically fluctuating the current range of welding current, force of an arc 707 periodically fluctuates between a large current period and a small current period, and constant and minute vibration with a relatively large frequency is given to the molten portion 706 even when fluctuation of welding current does not involve the above transition of droplet transfer form. Therefore, a relatively small frequency, or large swing of a buried space 706*a* caused unexpectedly is suppressed, and even only this provides a certain effect to stabilization of a buried space 706*a*. Consequently, it is possible with the present invention to realize a certain degree of stabilization of a buried space 706*a* even without involving the above transition of droplet transfer form.

It is to be noted that, as used herein and in the appended claims, the singular forms "a", "an", and "the" include plural referents unless the context clearly dictates otherwise.

The embodiments and examples described herein are illustrative in all respects and should be conceived as not restrictive from all sides. The scope of the present invention is defined not by the above description but by the appended claims, and meanings equivalent to the claims and all modifications within the scope are intended to be included.

It is to be noted that at least some of the above Embodiments 1 to 8 may be arbitrarily combined. Moreover, a welding method according to Embodiments 1 to 6 may be carried out in a welding device described in Embodiment 7.

INDUSTRIAL APPLICABILITY

A welding method of the present invention can be applied especially advantageously to welding which is required to improve work efficiency.

The invention claimed is:

1. A welding method comprising:
a step of preparing a first base material and a second base material;
a step of disposing the first base material and the second base material in a manner such that a first end face of the first base material and a second end face of the second base material face each other; and
a step of welding the first base material and the second base material together using GMA welding so that the first end face and the second end face are joined together,
wherein an arc is formed between a welding wire and each of the first base material and the second base material and a molten region is formed at the first base material and the second base material by heat of the arc, so that the first base material and the second base material are welded together in the step of welding the first base material and the second base material together, and
the arc is formed in a state where the welding wire penetrates into a region surrounded by the molten region, so that the molten region is formed to pierce through the first base material and the second base material in a thickness direction in the step of welding the first base material and the second base material together.

2. The welding method according to claim 1, wherein the arc is formed while a position of a tip of the welding wire reciprocates between a first depth and a second depth, which is deeper than the first depth, in the thickness direction of the first base material and the second base material in a state where the welding wire penetrates into a region surrounded by the molten region, so that the molten region is formed to pierce through the first base material and the second base material in the thickness direction in the step of welding the first base material and the second base material together.

3. The welding method according to claim 2, wherein a state where the welding wire penetrates to the first depth and a transfer form of a droplet formed by melting the welding wire into the molten region is rotating transfer and a state where the welding wire penetrates to the second depth and the transfer form is a transfer form other than rotating transfer are alternately repeated in the step of welding the first base material and the second base material together.

4. The welding method according to claim 1, wherein the arc is formed while a state where the welding wire penetrates into a region surrounded by the molten region and a state where the welding wire is out of a region surrounded by the molten region are alternately repeated, so that the molten is formed to pierce through the first base material and the second base material in the thickness direction in the step of welding the first base material and the second base material together.

5. The welding method according to claim 4, wherein the first base material and the second base material are welded together in a manner such that a thickness of the first base material and the second base material with respect to a width of the molten region in a direction perpendicular to the first end face and the second end face is equal to or smaller than 1.3 in the step of welding the first base material and the second base material together using GMA welding.

6. The welding method according to claim 4, wherein a feed speed of the welding wire is increased and decreased, so that a state where the welding wire penetrates into a region surrounded by the molten region and a state where the welding wire is out of a region surrounded by the molten region are alternately repeated in the step of welding the first base material and the second base material together.

7. The welding method according to claim 1, wherein a feed speed of the welding wire is equal to or higher than 30 m/min in the step of welding the first base material and the second base material together.

8. The welding method according to claim 1, wherein the first base material and the second base material having a thickness equal to or larger than 9 mm and equal to or smaller than 30 mm are prepared in the step of preparing the first base material and the second base material.

9. The welding method according to claim 1, wherein the first base material and the second base material having no beveling edge are welded together in the step of welding the first base material and the second base material together.

10. The welding method according to claim 1, wherein the first base material and the second base material are welded together in a state where voltage reduction with respect to current increase of 100 A is equal to or larger than 4 V and equal to or smaller than 20 V in the step of welding the first base material and the second base material together.

11. The welding method according to claim 10, wherein the voltage reduction is equal to or larger than 5 V.

12. The welding method according to claim 10, wherein the voltage reduction is equal to or smaller than 15 V.

13. The welding method according to claim 1, wherein the welding wire is a solid wire.

14. The welding method according to claim 1, wherein a diameter of the welding wire is equal to or larger than 0.9 mm and equal to or smaller than 1.6 mm.

* * * * *